(12) United States Patent
Shirayanagi

(10) Patent No.: US 6,652,097 B2
(45) Date of Patent: Nov. 25, 2003

(54) PROGRESSIVE-POWER SPECTACLE LENS

(75) Inventor: Moriyasu Shirayanagi, Saitama-ken (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 10/268,755

(22) Filed: Oct. 11, 2002

(65) Prior Publication Data

US 2003/0123025 A1 Jul. 3, 2003

(30) Foreign Application Priority Data

Oct. 12, 2001 (JP) ........................................ 2001-315280

(51) Int. Cl.⁷ ................................................. G02C 7/06
(52) U.S. Cl. ........................................ 351/169; 351/175
(58) Field of Search ................................ 351/169, 175, 351/177

(56) References Cited

U.S. PATENT DOCUMENTS

| | | | |
|---|---|---|---|
| 4,606,626 A | * | 8/1986 | Shinohara .................... 351/169 |
| 5,689,324 A | * | 11/1997 | Lossman et al. ............ 351/169 |
| 6,354,704 B2 | | 3/2002 | Yamamoto |

FOREIGN PATENT DOCUMENTS

| | | |
|---|---|---|
| GB | 2368661 | 5/2002 |
| WO | 02/088832 | 11/2002 |

OTHER PUBLICATIONS

"Asahi Optical New Progressive Lens Series", The Gankyo Shimbun, Sep. 21, 2001, in p. 3, together with a full English language translation.

* cited by examiner

*Primary Examiner*—Scott J. Sugarman
(74) *Attorney, Agent, or Firm*—Greenblum & Bernstein, P.L.C.

(57) ABSTRACT

A progressive-power spectacle lens includes a distance portion having a dioptric power for distance vision, a near portion having a dioptric power for near vision, and an intermediate portion having a progressive dioptric power between the distance portion and the near portion. At least one of front and back surfaces is formed as a progressive-power surface whose dioptric power varies depending upon a position thereon. The spectacle lens has a prismatic effect including a prescribed prismatic effect and unprescribed prismatic effect. A shape of the progressive-power surface of the spectacle lens is different from a shape of a progressive-power surface of a reference lens that is defined as a lens identical to the spectacle lens except that the prescribed prismatic effect is eliminated. The progressive surface of the spectacle lens is configured to compensate for aberration that is caused if the prescribed prismatic effect is added in the reference lens.

6 Claims, 35 Drawing Sheets

| | $D_1(h, \theta)$ | | | | | | | |
|---|---|---|---|---|---|---|---|---|
| h\θ | 0 | 45 | 90 | 135 | 180 | 225 | 270 | 315 |
| 0.0 | -3.09 | -3.01 | -3.15 | -3.22 | -3.09 | -3.01 | -3.15 | -3.22 |
| 5.0 | -3.05 | -3.60 | -3.61 | -3.55 | -3.17 | -2.32 | -2.46 | -2.29 |
| 10.0 | -3.17 | -3.56 | -3.61 | -3.68 | -3.38 | -2.15 | -1.90 | -1.99 |
| 15.0 | -3.19 | -3.45 | -3.55 | -3.62 | -3.48 | -2.31 | -1.79 | -2.02 |
| 20.0 | -3.14 | -3.32 | -3.52 | -3.53 | -3.49 | -2.53 | -1.87 | -2.19 |
| 25.0 | -3.14 | -3.28 | -3.47 | -3.54 | -3.58 | -2.74 | -1.90 | -2.28 |

| ΔD(h, θ) | | | | | | | | |
|---|---|---|---|---|---|---|---|---|
| h \ θ | 0 | 45 | 90 | 135 | 180 | 225 | 270 | 315 |
| 0.0 | 0.00 | 0.00 | 0.00 | 0.00 | 0.00 | 0.00 | 0.00 | 0.00 |
| 5.0 | 0.03 | 0.01 | -0.01 | -0.02 | -0.03 | -0.02 | 0.02 | 0.04 |
| 10.0 | 0.09 | 0.03 | -0.03 | -0.08 | -0.10 | -0.05 | 0.05 | 0.11 |
| 15.0 | 0.15 | 0.05 | -0.04 | -0.12 | -0.16 | -0.08 | 0.08 | 0.18 |
| 20.0 | 0.17 | 0.06 | -0.05 | -0.15 | -0.19 | -0.09 | 0.09 | 0.21 |
| 25.0 | 0.20 | 0.07 | -0.07 | -0.19 | -0.24 | -0.11 | 0.11 | 0.24 |

| $D_1(h, \theta)$ | | | | | | | | |
|---|---|---|---|---|---|---|---|---|
| h\θ | 0 | 45 | 90 | 135 | 180 | 225 | 270 | 315 |
| 0.0 | -3.09 | -3.01 | -3.14 | -3.22 | -3.09 | -3.01 | -3.14 | -3.22 |
| 5.0 | -3.08 | -3.64 | -3.62 | -3.55 | -3.14 | -2.26 | -2.42 | -2.29 |
| 10.0 | -3.26 | -3.66 | -3.67 | -3.68 | -3.28 | -1.98 | -1.78 | -1.99 |
| 15.0 | -3.34 | -3.62 | -3.67 | -3.62 | -3.32 | -2.05 | -1.61 | -2.02 |
| 20.0 | -3.31 | -3.53 | -3.67 | -3.53 | -3.30 | -2.23 | -1.66 | -2.19 |
| 25.0 | -3.34 | -3.54 | -3.66 | -3.54 | -3.34 | -2.39 | -1.67 | -2.28 |

| ΔD(h, θ) | | | | | | | | |
|---|---|---|---|---|---|---|---|---|
| h\θ | 0 | 45 | 90 | 135 | 180 | 225 | 270 | 315 |
| 0.0 | 0.00 | 0.00 | 0.00 | 0.00 | 0.00 | 0.00 | 0.00 | 0.00 |
| 5.0 | 0.00 | -0.02 | -0.03 | -0.02 | 0.00 | 0.04 | 0.05 | 0.04 |
| 10.0 | 0.00 | -0.08 | -0.09 | -0.08 | 0.00 | 0.11 | 0.17 | 0.11 |
| 15.0 | 0.00 | -0.12 | -0.16 | -0.12 | 0.00 | 0.18 | 0.26 | 0.18 |
| 20.0 | 0.00 | -0.15 | -0.20 | -0.15 | 0.00 | 0.21 | 0.31 | 0.21 |
| 25.0 | 0.00 | -0.19 | -0.25 | -0.19 | 0.00 | 0.24 | 0.34 | 0.24 |

| | $D_0(h, \theta)$ | | | | | | | |
|---|---|---|---|---|---|---|---|---|
| h\θ | 0 | 45 | 90 | 135 | 180 | 225 | 270 | 315 |
| 0.0 | −5.30 | −5.22 | −5.36 | −5.44 | −5.30 | −5.22 | −5.36 | −5.44 |
| 5.0 | −5.19 | −5.71 | −5.69 | −5.62 | −5.26 | −4.43 | −4.62 | −4.47 |
| 10.0 | −5.13 | −5.39 | −5.35 | −5.40 | −5.15 | −4.04 | −3.92 | −4.04 |
| 15.0 | −4.91 | −4.92 | −4.87 | −4.92 | −4.89 | −3.95 | −3.65 | −3.91 |
| 20.0 | −4.60 | −4.43 | −4.42 | −4.43 | −4.58 | −3.97 | −3.61 | −3.93 |
| 25.0 | −4.43 | −4.10 | −4.03 | −4.10 | −4.43 | −4.08 | −3.62 | −3.97 |

| | $D_1(h, \theta)$ | | | | | | | |
|---|---|---|---|---|---|---|---|---|
| h \ θ | 0 | 45 | 90 | 135 | 180 | 225 | 270 | 315 |
| 0.0 | -5.29 | -5.21 | -5.36 | -5.44 | -5.29 | -5.21 | -5.36 | -5.44 |
| 5.0 | -5.24 | -5.75 | -5.70 | -5.60 | -5.20 | -4.38 | -4.60 | -4.50 |
| 10.0 | -5.28 | -5.49 | -5.38 | -5.34 | -5.01 | -3.88 | -3.87 | -4.13 |
| 15.0 | -5.10 | -5.06 | -4.91 | -4.84 | -4.69 | -3.72 | -3.58 | -4.04 |
| 20.0 | -4.82 | -4.57 | -4.46 | -4.35 | -4.37 | -3.72 | -3.52 | -4.08 |
| 25.0 | -4.75 | -4.29 | -4.08 | -4.01 | -4.18 | -3.76 | -3.51 | -4.18 |

| ΔD(h, θ) | | | | | | | | |
|---|---|---|---|---|---|---|---|---|
| h \ θ | 0 | 45 | 90 | 135 | 180 | 225 | 270 | 315 |
| 0.0 | 0.01 | 0.01 | 0.00 | 0.00 | 0.01 | 0.01 | 0.00 | 0.00 |
| 5.0 | -0.05 | -0.04 | -0.01 | 0.02 | 0.05 | 0.06 | 0.02 | -0.03 |
| 10.0 | -0.15 | -0.11 | -0.03 | 0.06 | 0.15 | 0.16 | 0.05 | -0.09 |
| 15.0 | -0.20 | -0.14 | -0.04 | 0.08 | 0.20 | 0.23 | 0.08 | -0.13 |
| 20.0 | -0.22 | -0.14 | -0.04 | 0.08 | 0.21 | 0.25 | 0.09 | -0.15 |
| 25.0 | -0.32 | -0.19 | -0.04 | 0.09 | 0.25 | 0.32 | 0.12 | -0.21 |

| $D_0(h,\theta)$ | | | | | | | | |
|---|---|---|---|---|---|---|---|---|
| h\θ | 0 | 45 | 90 | 135 | 180 | 225 | 270 | 315 |
| 0.0 | -0.88 | -0.80 | -0.94 | -1.02 | -0.88 | -0.80 | -0.94 | -1.02 |
| 5.0 | -1.00 | -1.55 | -1.54 | -1.46 | -1.06 | -0.21 | -0.38 | -0.24 |
| 10.0 | -1.49 | -1.87 | -1.88 | -1.88 | -1.51 | -0.28 | -0.11 | -0.28 |
| 15.0 | -1.94 | -2.19 | -2.24 | -2.20 | -1.92 | -0.73 | -0.34 | -0.70 |
| 20.0 | -2.21 | -2.41 | -2.56 | -2.41 | -2.20 | -1.20 | -0.68 | -1.16 |
| 25.0 | -2.45 | -2.63 | -2.75 | -2.63 | -2.45 | -1.57 | -0.88 | -1.45 |

| $D_1(h, \theta)$ | | | | | | | | |
|---|---|---|---|---|---|---|---|---|
| h\θ | 0 | 45 | 90 | 135 | 180 | 225 | 270 | 315 |
| 0.0 | -0.88 | -0.80 | -0.94 | -1.02 | -0.88 | -0.80 | -0.94 | -1.02 |
| 5.0 | -1.00 | -1.55 | -1.54 | -1.46 | -1.06 | -0.20 | -0.36 | -0.23 |
| 10.0 | -1.49 | -1.88 | -1.88 | -1.89 | -1.51 | -0.24 | -0.05 | -0.24 |
| 15.0 | -1.94 | -2.23 | -2.27 | -2.23 | -1.92 | -0.66 | -0.22 | -0.63 |
| 20.0 | -2.21 | -2.49 | -2.66 | -2.49 | -2.20 | -1.10 | -0.52 | -1.06 |
| 25.0 | -2.45 | -2.75 | -2.92 | -2.75 | -2.45 | -1.43 | -0.68 | -1.32 |

| ΔD(h, θ) | | | | | | | | |
|---|---|---|---|---|---|---|---|---|
| h\θ | 0 | 45 | 90 | 135 | 180 | 225 | 270 | 315 |
| 0.0 | 0.00 | 0.00 | -0.01 | 0.00 | 0.00 | 0.00 | -0.01 | 0.00 |
| 5.0 | 0.00 | -0.01 | 0.00 | 0.00 | 0.00 | 0.01 | 0.01 | 0.01 |
| 10.0 | 0.00 | -0.01 | 0.00 | -0.01 | 0.00 | 0.04 | 0.06 | 0.04 |
| 15.0 | 0.00 | -0.03 | -0.03 | -0.03 | 0.00 | 0.08 | 0.12 | 0.08 |
| 20.0 | 0.00 | -0.08 | -0.10 | -0.08 | 0.00 | 0.11 | 0.16 | 0.11 |
| 25.0 | 0.00 | -0.12 | -0.16 | -0.12 | 0.00 | 0.14 | 0.20 | 0.14 |

| | $D_0(h, \theta)$ | | | | | | | |
|---|---|---|---|---|---|---|---|---|
| h \ θ | 0 | 45 | 90 | 135 | 180 | 225 | 270 | 315 |
| 0.0 | -6.30 | -5.22 | -6.36 | -7.44 | -6.30 | -5.22 | -6.36 | -7.44 |
| 5.0 | -6.18 | -5.71 | -6.67 | -7.60 | -6.25 | -4.43 | -5.62 | -6.47 |
| 10.0 | -6.10 | -5.39 | -6.30 | -7.33 | -6.13 | -4.04 | -4.92 | -6.04 |
| 15.0 | -5.85 | -4.92 | -5.76 | -6.77 | -5.83 | -3.95 | -4.65 | -5.91 |
| 20.0 | -5.52 | -4.43 | -5.25 | -6.21 | -5.51 | -3.97 | -4.64 | -6.01 |
| 25.0 | -5.37 | -4.10 | -4.83 | -5.87 | -5.38 | -4.08 | -4.75 | -6.23 |

| | $D_1(h, \theta)$ | | | | | | | |
|---|---|---|---|---|---|---|---|---|
| h \ θ | 0 | 45 | 90 | 135 | 180 | 225 | 270 | 315 |
| 0.0 | -6.30 | -5.22 | -6.35 | -7.43 | -6.30 | -5.22 | -6.35 | -7.43 |
| 5.0 | -6.18 | -5.69 | -6.63 | -7.57 | -6.25 | -4.47 | -5.67 | -6.51 |
| 10.0 | -6.10 | -5.33 | -6.20 | -7.24 | -6.13 | -4.14 | -5.08 | -6.15 |
| 15.0 | -5.85 | -4.84 | -5.64 | -6.67 | -5.83 | -4.08 | -4.86 | -6.07 |
| 20.0 | -5.52 | -4.35 | -5.14 | -6.10 | -5.51 | -4.13 | -4.92 | -6.21 |
| 25.0 | -5.37 | -4.01 | -4.69 | -5.72 | -5.38 | -4.30 | -5.18 | -6.56 |

| ΔD(h, θ) | | | | | | | | |
|---|---|---|---|---|---|---|---|---|
| h \ θ | 0 | 45 | 90 | 135 | 180 | 225 | 270 | 315 |
| 0.0 | 0.00 | 0.00 | 0.01 | 0.00 | 0.00 | 0.00 | 0.01 | 0.00 |
| 5.0 | 0.00 | 0.03 | 0.04 | 0.04 | 0.00 | -0.03 | -0.06 | -0.04 |
| 10.0 | 0.00 | 0.06 | 0.10 | 0.09 | 0.00 | -0.10 | -0.16 | -0.11 |
| 15.0 | 0.00 | 0.08 | 0.12 | 0.11 | 0.00 | -0.13 | -0.21 | -0.15 |
| 20.0 | 0.00 | 0.08 | 0.11 | 0.11 | 0.00 | -0.16 | -0.28 | -0.20 |
| 25.0 | 0.00 | 0.09 | 0.14 | 0.16 | 0.00 | -0.22 | -0.43 | -0.32 |

| h\θ | D(h, θ) | | | | | | | |
|---|---|---|---|---|---|---|---|---|
| | 0 | 45 | 90 | 135 | 180 | 225 | 270 | 315 |
| 0.0 | 4.14 | 4.18 | 4.09 | 4.05 | 4.14 | 4.18 | 4.09 | 4.05 |
| 5.0 | 4.36 | 4.05 | 4.01 | 4.05 | 4.36 | 4.97 | 4.75 | 4.95 |
| 10.0 | 4.32 | 4.05 | 4.08 | 4.05 | 4.32 | 5.42 | 5.41 | 5.44 |
| 15.0 | 4.31 | 4.20 | 4.14 | 4.20 | 4.31 | 5.44 | 5.87 | 5.43 |
| 20.0 | 4.35 | 4.24 | 4.19 | 4.24 | 4.35 | 5.30 | 5.89 | 5.36 |
| 25.0 | 4.32 | 4.31 | 4.26 | 4.31 | 4.32 | 5.18 | 5.87 | 5.26 |

PROGRESSIVE-POWER SPECTACLE LENS

BACKGROUND OF THE INVENTION

The present invention relates to a progressive-power spectacle lens to correct eyesight, and particularly, to a progressive-power lens having a prismatic power to correct heterophoria of an eye.

A progressive-power spectacle lens has a front surface (an object side) and a back surface (an eye side), and at least one of the surfaces is configured as a progressive-power surface whose dioptric power varies depending on the position thereon. FIG. 59 is a plan view showing one example of a progressive-power surface 2 of a conventional progressive-power lens 1. The progressive-power lens 1 includes a distance portion 3 having a dioptric power for distance vision at an upper area of the lens, a near portion 4 having a dioptric power for near vision at a lower area of the lens, and an intermediate portion 5 having a progressive dioptric power changing between the distance portion 3 and the near portion 4. A fitting point E that is a reference point with respect to a position of a user's eye when the lens is installed in a frame, a distance reference point F, a near reference point N and a prism reference point PR for measuring dioptric powers are defined on the progressive-power surface 2.

Since the curvature of the progressive-power surface 2 gradually increases or decreases from the upper side to the lower side within the intermediate portion, the thickness of the upper edge is different from that of the lower edge when the front and back surfaces are arranged to be perpendicular to a common normal at the center thereof.

FIG. 60A is a cross sectional side view of a progressive-power lens that is designed such that the front and back surfaces are perpendicular to a common axis at the center thereof. In this example, the lens of FIG. 60A has a plus distance dioptric power and the front surface thereof is formed as a progressive-power surface. As shown in FIG. 60A, the entire lens becomes exceedingly thick to keep a necessary thickness at the lower edge, which increases the weight of the lens. In order to reduce the thickness and weight of the lens, a method known as "prism thinning" for relatively tilting the front and back surfaces to uniform the thickness at both upper and lower edges as shown in FIG. 60B is generally employed. This method introduces unprescribed prism effect in the lens.

FIG. 61A is across sectional view of another example of a conventional progressive-power spectacle lens, having a minus distance dioptric power. In this example, a front surface is formed as a progressive-power surface that is designed such that the front and back surfaces are perpendicular to a common axis at the center thereof. As shown in FIG. 61A, the thickness of the upper edge and the lower edge are unbalanced. Application of the prism thinning to the lens balances the thickness as shown in FIG. 61B, however, an unprescribed prism effect is introduced. It should be noted that wedge marks indicated in the lenses of FIGS. 60B and 61B show the unprescribed prism effect introduced by the prism thinning and the like.

Conventional progressive-power spectacle lenses are designed to include the unprescribed prism effect in order to reduce the thickness/weight and/or improve appearance. Specifically, the conventional progressive-power spectacle lenses are designed such that aberrations are well reduced with the above-described prism effect being introduced. An example of such a conventional progressive-power spectacle lens will be described.

The exemplary conventional progressive-power spectacle lens is designed for a right eye and has a progressive-power front surface and a spherical back surface. The spherical dioptric power is 0.00 diopter (referred to as "D" hereinafter), the addition power is 2.00D, the center thickness is 2.53 mm, the outer diameter is 80 mm and the refractive index is 1.60. The unprescribed prismatic effect, whose prismatic power is 1.47 prism-diopter (referred to as $\Delta$ hereinafter) and whose prism base setting is 270°, is introduced to thin the lens and to uniform the edge thickness.

FIGS. 62A and 62B show a coordinate system for illustrating performance of the progressive-power surface. The coordinate system is a left-hand orthogonal x-y-z coordinate system. The z-axis is a normal to the progressive-power surface at the prism reference point PR that is the origin of the coordinate system. The y-axis is perpendicular to the z-axis and is a vertical axis when the lens is installed in a frame. The x-axis is perpendicular to both the z-axis and the y-axis and is a horizontal axis when the lens is installed in a frame. A curvature at a point at a distance h (unit: mm) from the z-axis on an intersection line of the progressive-power surface and a plane that includes the z-axis and forms an angle θ (unit: degrees) with the x-axis is expressed as a function C (h, θ) (unit: D). A surface power D(h, θ) (unit: D) at the point (h, θ) is defined by a function D(h, θ)=(n'−n)C(h, θ). Reference n denotes a refractive index of medium on an object side with respect to the progressive-power surface, and n' is a refractive index of medium on an eye side with respect to the progressive-power surface.

Table shown in FIG. 63 indicates distribution of the surface power D(h, θ) of the progressive-power surface of the conventional lens at a point indicated by the polar coordinate (h, θ), i.e., at a point indicated by a distance h (mm) from the prism reference point PR and an angle θ (degree) with respect to the x-axis. Further, FIG. 64 is a graph showing relationships between the surface powers D(h, θ) and the angle θ for the distances h=10 mm, 15 mm, 20 mm and 25 mm, respectively. The surface power is relatively low in the distance portion within 30≦θ≦150 and relatively high in the near portion within 240 ≦θ≦300.

FIGS. 65 and 66 are three-dimension graphs showing transmitting optical performances of the conventional progressive-power spectacle lens. FIG. 65 shows a mean refractive power error and FIG. 66 shows astigmatism. In the graphs, plane coordinates represent angles of visual axis (unit: degree) in the vertical and horizontal directions, respectively, and the vertical axis of the graphs represents amount of aberration (unit: D).

A progressive-power spectacle lens for correcting heterophoria (Symptom: visual axes are deviated during a resting period) requires a prismatic effect for correcting heterophoria based on a prescription in addition to the unprescribed prismatic effect introduced by the prism thinning. FIG. 67 is a horizontal cross sectional view of a lens that is designed by adding the prescribed prismatic effect for correcting heterophoria to the above-described conventional progressive-power spectacle lens. The front and back surfaces of the spectacle lens are relatively tilted to provide a necessary prism effect.

The above-described conventional progressive-power spectacle lens is designed such that front and back surfaces-originally designed for a lens having no prescribed prismatic effect are tilted with respect to each other to produce the desired prismatic effect. Therefore, although heterophoria can be corrected, aberration caused by the prescribed prismatic effect is not taken into consideration.

For instance, when the prismatic effect for correcting heterophoria whose prismatic power is 3.00 Δ and prism base setting is 180° is introduced to the conventional progressive-power spectacle lens, the mean refractive power error and the astigmatism vary as shown in FIGS. 68 and 69, respectively. The mean refractive power error increases at the ear side in the distance portion, the astigmatism increases at the upper portion of the ear side and the nose side in the distance portion, and the balance of the aberrations between the ear side and the nose side is lost across the entire area.

SUMMARY OF THE INVENTION

The present invention is advantageous in that there is provided a progressive-power spectacle lens with a prescribed prismatic effect to correct heterophoria of an eye, which has a sufficient optical performance that is equivalent to that of a progressive-power spectacle lens without a prescribed prismatic effect.

According to an aspect of the invention, aberration caused due to a prescribed prismatic effect is corrected by employing a progressive-power surface that is different from that of a reference lens. The reference lens is defined as a hypothetical lens which functions similar to the actual spectacle lens except that a prescribed prismatic effect is eliminated. That is, the reference lens is identical in terms of a spherical power, an astigmatic power, a cylinder axis and an addition power to the actual spectacle lens.

Specifically, condition: $\Delta D(h, \theta) < 0$ is satisfied at a point within a region that is defined by $10 \leq h \leq 20$ and $\Delta B - 45 \leq \theta \leq \Delta B + 45$, and condition: $\Delta D(h, \theta) > 0$ is satisfied at a point within a region that is defined by $10 \leq h \leq 20$ and $\Delta B + 135 \leq \theta \leq \Delta B + 225$, where, $$\Delta B = \tan^{-1} \frac{P_1 \cdot \sin(B_1) - P_0 \cdot \sin(B_0)}{P_1 \cdot \cos(B_1) - P_0 \cdot \cos(B_0)},$$

$\Delta D(h, \theta) = D_1(h, \theta) - D_0(h, \theta)$, parameters with suffix "1" represent values for the spectacle lens, parameters with suffix "0" represent values for a reference lens that is defined as a lens identical to the spectacle lens except that the prescribed prismatic effect is eliminated, the progressive surface of the spectacle lens being configured to compensate for aberration that is caused if the prescribed prismatic effect is added in the reference lens P is a prismatic power (unit: prism diopter) at a prism reference point, the prism reference point being an origin of an x-y-z orthogonal left-hand coordinate system, z-axis being a normal to the progressive-power surface at a prism reference point that is the origin of the x-y-z coordinate system, y-axis being perpendicular to the z-axis and being a vertical axis when the spectacle lens is installed in a frame, x-axis being perpendicular to both the z-axis and y-axis in the left-hand coordinate system, the x-axis being a horizontal axis when the actual lens is Installed in the frame;

B is a prism base setting (unit: degree), $D(h, \theta)$ is a surface power (unit: diopter) of the progressive-power surface of the spectacle lens, the surface power being defined by formula: $D(h, \theta) = (n''-n)C(h, \theta)$, $C(h, \theta)$ is a curvature (unit: diopter) at a point at a distance h from the z-axis on a line where the progressive-power surface intersects with a plane that includes the z-axis and forms an angle θ (unit: degrees) with x-axis, the z-axis being a normal, at the prism reference point, to the progressive-power surface of the spectacle lens, n is a refractive index of a medium on an object side with respect to the progressive-power surface of the spectacle lens, and n' is a refractive index of a medium on an eye side with respect to the progressive-power surface of the spectacle lens.

Further, in order to respond to various combinations of a spherical power, a cylindrical power, a cylindrical axis direction, a prismatic power and a prism base setting, it is preferable that semi-finished lenses whose front surfaces are finished are stockpiled and a back surface of a selected semi-finished lens is processed according to the customer's specification.

Optionally, the back surface may be formed as a progressive-power surface. With such a configuration, it is easy to produce the semifinished lenses. Further optionally, the front surface may be formed as a spherical surface.

DESCRIPTION OF THE ACCOMPANYING DRAWINGS

DESCRIPTION OF THE EMBODIMENTS

A progressive-power spectacle lens embodying the present invention will be described hereinafter. First, a general construction of a spectacle lens embodying the invention will be described with reference to FIGS. 1 and 2, and then specific examples will be described.

Figure 1:
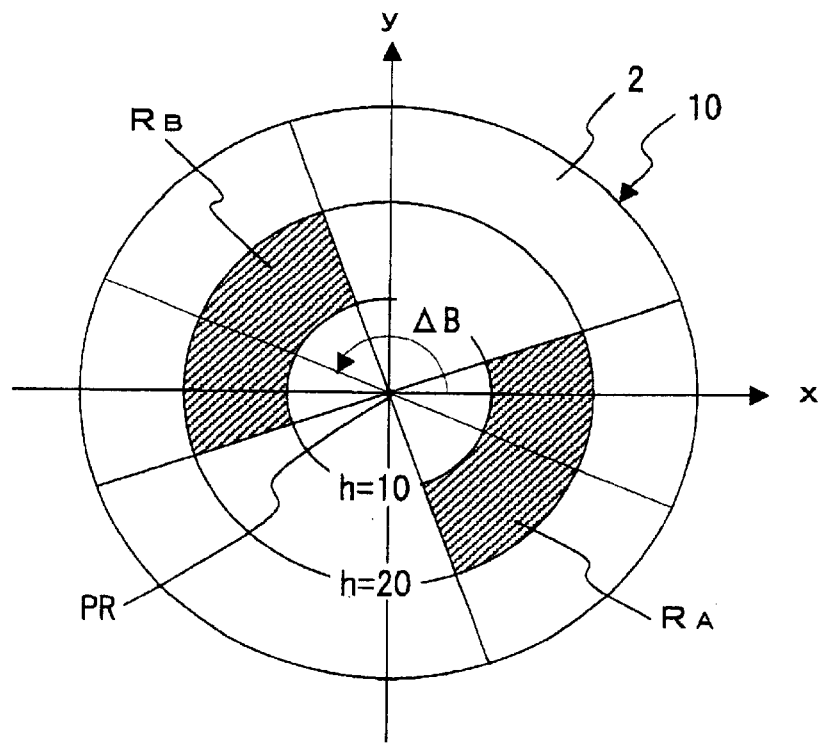
FIG. 1 is a front view of a progressive-power surface of a progressive-power spectacle lens according to an embodiment of the invention viewed from a front surface.

FIG. 1 is a front view of a progressive-power surface 2 of a progressive-power spectacle lens 10 having a prescribed prismatic effect according to an embodiment of the invention. In the following description, the progressive-power spectacle lens 10, which is occasionally referred to as an actual progressive-power spectacle lens, is described in comparison with a reference lens. The actual progressive-power spectacle lens 10 is distinguished by the prescribed prismatic effect from the reference lens, which is the optimum lens when the lens has no prescribed prismatic effect and is identical to the actual lens in terms of a spherical power, an astigmatic power, a cylinder axis and an addition power.

Figure 62A:
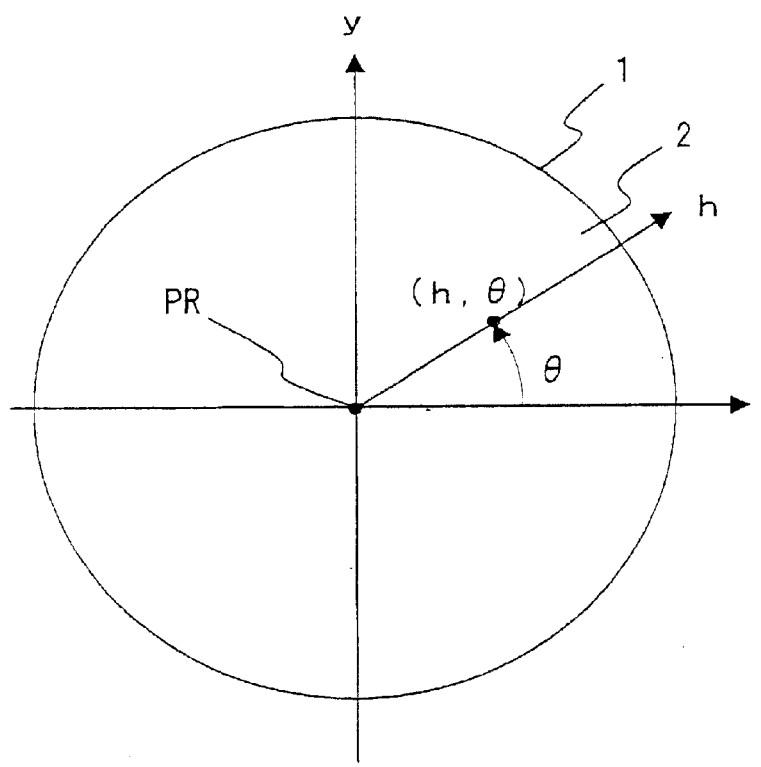
FIGS. 62A and 62B show a coordinate system for describing the progressive-power surface.
Figure 62B:
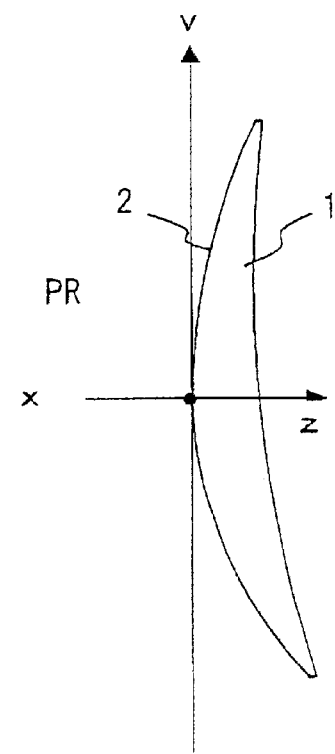
Figures 63, 64:
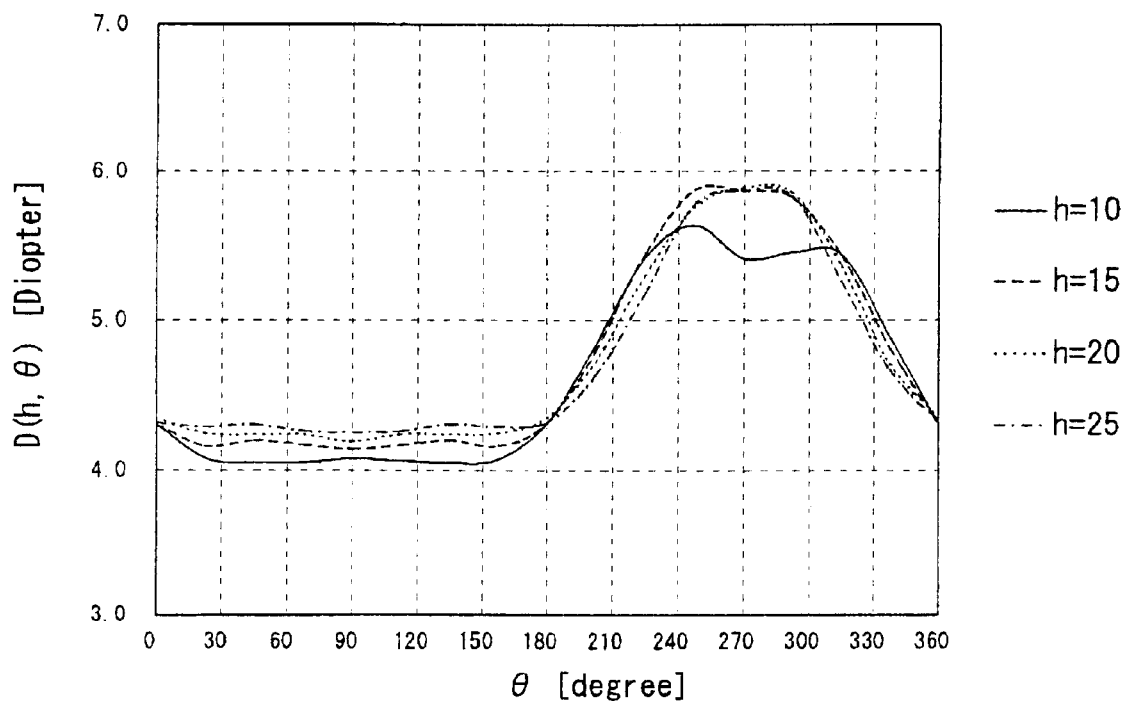
FIG. 63 is a table showing distribution of a surface power of the progressive-power surface of a conventional progressive-power spectacle lens that has no prescribed prismatic effect.
FIG. 64 is a graph showing variations of the surface powers of the progressive-power surface of the conventional progressive-power lens that has no prescribed prismatic effect.
Figure 65:
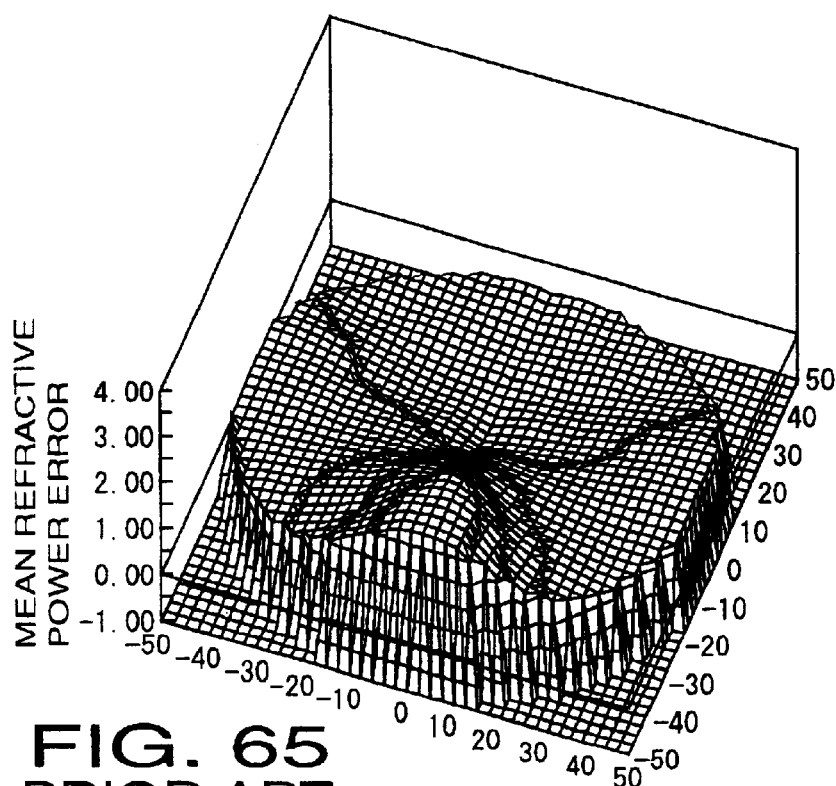
FIG. 65 is a three-dimension graph showing a mean refractive power error of the conventional progressive-power spectacle lens.
Figure 66:
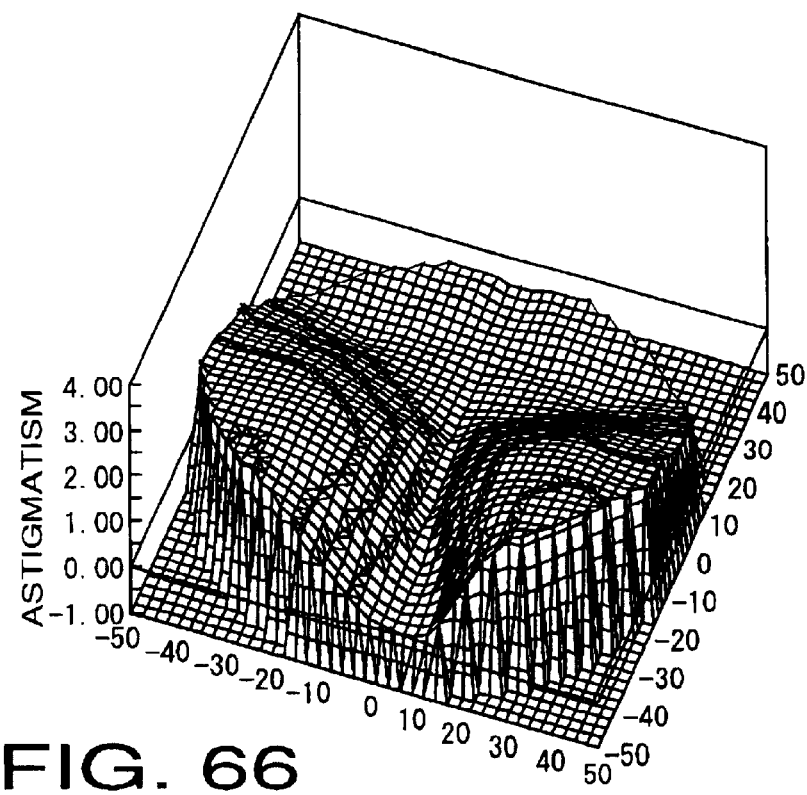
FIG. 66 is a three-dimension graph showing astigmatism of the conventional progressive-power lens.
Figure 67:
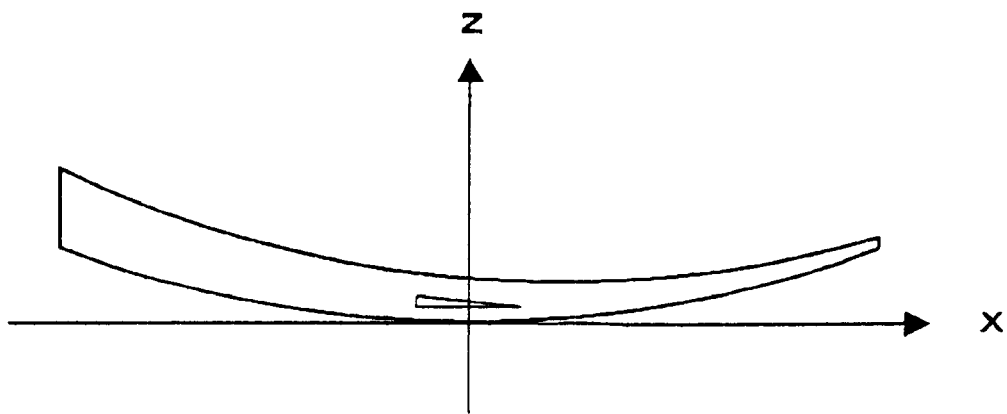
FIG. 67 is a horizontal sectional view of a lens that is designed by adding the prescribed prismatic effect to the conventional progressive-power spectacle lens.
Figure 68:
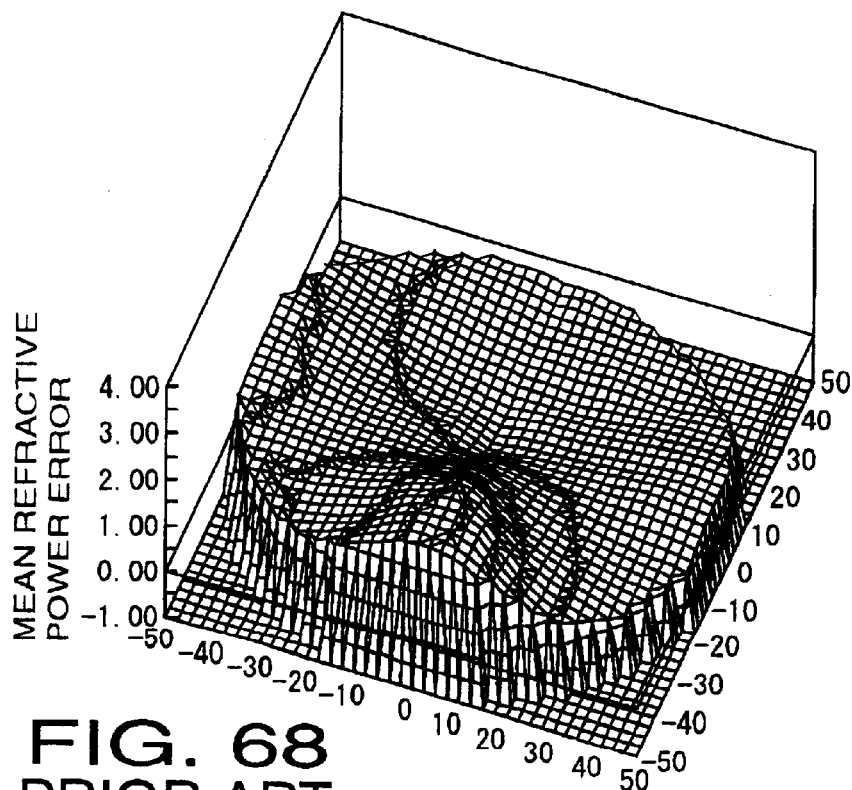
FIG. 68 is a three-dimension graph showing a mean refractive power error of the lens shown in FIG. 67.
Figure 69:
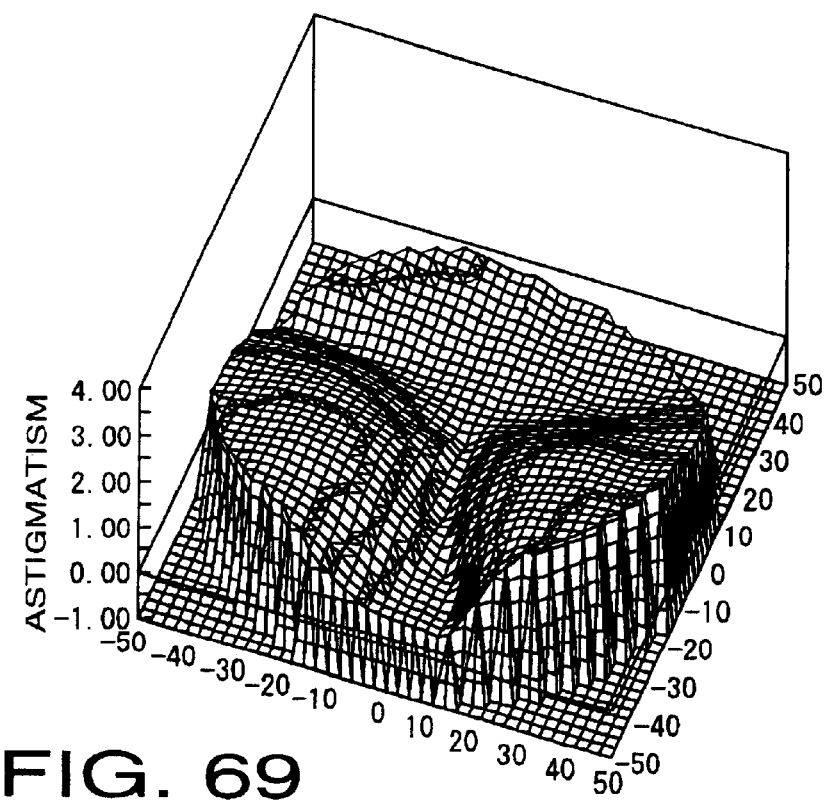
FIG. 69 is a three-dimension graph showing astigmatism of the lens shown in FIG. 67.

A three-dimensional coordinate system as shown in FIG. 62A is introduced. That is, the prism reference point is defined as the origin, the z-axis is defined as a normal to the progressive-power surface at the origin, the y-axis is defined to be perpendicular to the z-axis and to be a vertical axis when the actual lens is installed in a frame, and the x-axis is defined to be perpendicular to both the z-axis and the y-axis in accordance with the left-hand coordinate system and to be a horizontal axis when the actual lens is installed in a frame. FIGS. 62A and 62B show the example of the progressive-power spectacle lens whose front surface is a progressive-power surface. If a back surface is a progressive-power surface, the z-axis is defined as a normal to the back surface and it is not required to change the definitions of the y-axis and the x-axis.

For the actual progressive-power spectacle lens with the prescribed prismatic effect, a curvature (D) at a point at a distance h (mm) from the z-axis on an intersection line of the progressive-power surface and a plane including the z-axis and forms an angle θ (°) with the x-axis is represented by a function $C_1(h, θ)$ (D), a surface power is represented by a function $D_1(h, θ)=(n'-n)C_1(h, θ)$, where n is a refractive index of medium on an object side with respect to the progressive-power surface and n' is a refractive index of medium on an eye side with respect to the progressive-power surface. Further, the resultant total prismatic power $P_1$ (D) of the prescribed prismatic power and an unprescribed prismatic power caused by the prism shinning at the prism reference point and the prism base setting $B_1$ (°) are defined for the actual progressive-power spectacle lens.

For the reference lens that has no prescribed prismatic effect, the curvature $C_0(h, θ)$ (D) of the progressive-power surface, the surface power $D_0(h, θ)$ (D), the unprescribed prismatic power $P_0$ (Δ) at the prism reference point and the prism base setting $B_0$ (°) are defined.

Figure 2:
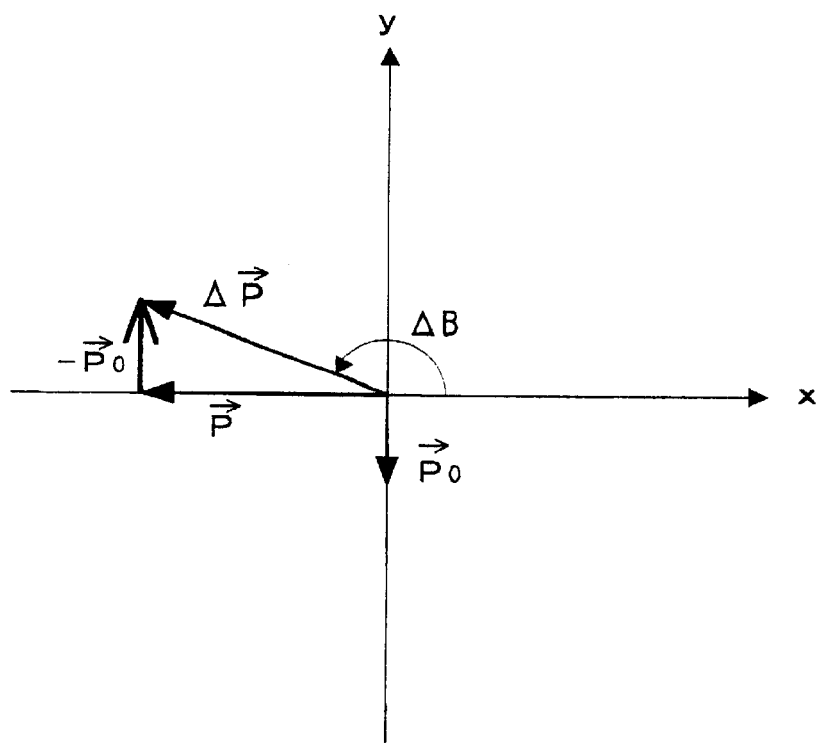
FIG. 2 shows a vector operation for finding a difference between prismatic effects.

In general, a prismatic effect is represented by a vector whose magnitude represents a prismatic power P and a direction represents prism base setting B. When the prismatic effect of the actual lens, which is a resultant prismatic effect of the prescribed prismatic effect and the unprescribed prismatic effect, is represented by a vector $P_1$ and the unprescribed prismatic effect of the reference lens is represented by a vector $P_0$, a differential prismatic effect ΔP is found by the subtraction of the vectors as shown in FIG. 2. Further, the differential prismatic power ΔP and the prism base setting ΔB thereof are expressed by the following equations.

$$\Delta P = \sqrt{\{P \cdot \cos(B) - P_0 \cdot \cos(B_0)\}^2 + \{P \cdot \sin(B) - P_0 \cdot \sin(B_0)\}^2}$$

$$\Delta B = \tan^{-1} \frac{P \cdot \sin(B) - P_0 \cdot \sin(B_0)}{P \cdot \cos(B) - P_0 \cdot \cos(B_0)}$$

A difference ΔD(h, θ) between the surface power $D_1(h, θ)$ of the actual progressive-power spectacle lens having the prescribed prismatic effect and the surface power $D_0(h, θ)$ of the reference lens that has no prescribed prismatic effect at a point (h, θ) is defined as follows.

$$\Delta D(h, θ)=D_1(h, θ)-D_0(h, θ)$$

Progressive-power spectacle lenses according to embodiments, which will be described later, satisfy the condition (1) at a point within a region that is defined by $10 \leq h \leq 20$ and $\Delta B-45 \leq θ \leq \Delta B+45$, and satisfy the condition (2) at a point within a region that is defined by $10 \leq h \leq 20$ and $\Delta B+135 \leq θ \leq \Delta B+225$.

$$\Delta D(h, θ)<0 \quad (1)$$

$$\Delta D(h, θ)>0 \quad (2)$$

A hatched region RB in FIG. 1 is a base region of a differential prism, which represents a difference of prism effects between the actual lens and the reference lens, defined by $10 \leq h \leq 20$ and $\Delta B-45 \leq θ \leq \Delta B+45$. A hatched region RA is an apex region of the differential prism defined by $10 \leq h \leq 20$ and $\Delta B+135 \leq θ \leq \Delta B+225$. The condition (1) shows that there is a point in the region RB at which the surface power of the actual lens is smaller than the surface power of the reference lens and the condition (2) shows that there is a point in the region RA at which the surface power of the actual lens is larger than the surface power of the reference lens. Since the progressive-power surface of the actual lens is designed to satisfy the above-described conditions (1) and (2), the progressive-power surface of the actual lens becomes different from that of the reference lens. With this configuration, the optical performance of the actual progressive-power spectacle lens can be improved as compared with the case where the prescribed prismatic effect is introduced to the reference lens without changing the shape of the progressive-power surface. As a result, the optical performance of the actual lens having the prescribed prismatic effect can be close to that of the reference lens that has no prescribed prismatic effect.

Hereafter, five concrete embodiments of the progressive-power spectacle lens according to the embodiment of the present invention will be described. In the following description, lenses falling in three categories will be described for each embodiment. The lenses of the three categories are:

(A) A reference lens that is identical to the actual lens in terms of prescriptions except that the prescribed prismatic effect is eliminated;

(B) A lens according to a comparative example that is formed by relatively tilting the front and back surfaces of the reference lens to introduce the prescribed prismatic effect; and (C) An actual lens according to the embodiment.

The refractive index of the lenses of the concrete embodiments is 1.67.

First Embodiment

In the first embodiment and the first comparative example corresponding to the first embodiment, the progressive-power spectacle lens has a spherical front surface and a progressive-power back surface and has no cylindrical power for correcting astigmatism. The reference lens corresponding to the first embodiment, whose specification is shown in TABLE 1, has no prescribed prismatic effect for correcting heterophoria, while it has an unprescribed prismatic effect caused by the prism thinning. In TABLE 1 and other TABLEs, SPH denotes a vertex spherical power, CYL denotes a cylindrical power, AX denotes a direction of the cylinder axis, ADD denotes a addition power, PRS denotes a prismatic power, BASE denotes a prism base setting direction, D1 denotes a surface power of the front surface, D2F denotes a surface power of the back surface at the distance reference point, T denotes a center thickness and DIA is an outer diameter before edging.

TABLE 1

| SPH | 0.00 D | $D_1$ | 3.58 D |
|---|---|---|---|
| CYL | 0.00 D | $D_{2F}$ | 3.59 D |
| AX | — | T | 2.39 mm |
| ADD | 2.00 D | DIA | 75 mm |
| PRS | 1.20 Δ | — | — |
| BASE | 270° | — | — |

Figures 3, 4:
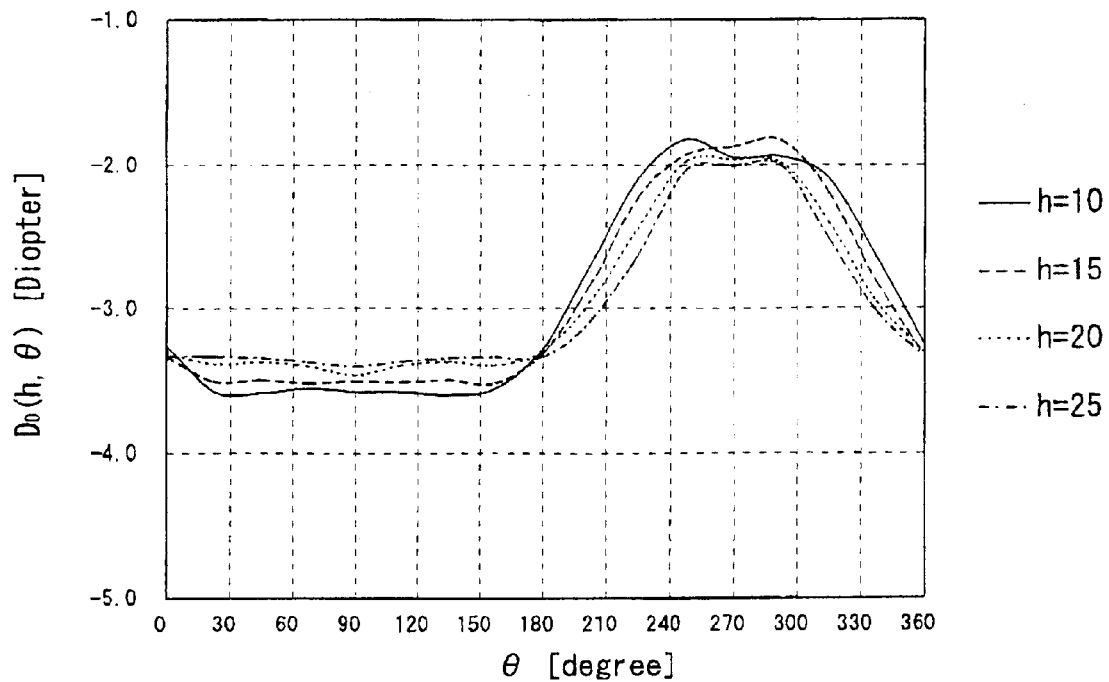
FIG. 3 is a table showing distribution of a surface power of the progressive-power surface of a reference lens for a first embodiment.
FIG. 4 is a graph showing variations of the surface powers of the progressive-power surface of the reference lens for the first embodiment.

The table in FIG. 3 indicates distribution of the surface power $D_0(h, \theta)$ of the progressive-power back surface of the reference lens corresponding to the first embodiment at a point $(h, \theta)$, i.e., at a point which is located at a distance h (mm) from the prism reference point PR on an intersection line of the progressive-power back surface with a plane that includes the z-axis and forms an angle θ (°) with respect to the x-axis. FIG. 4 is a graph showing a relationship between the surface powers $D_0(h, \theta)$ and the angle θ for each of the distances h 10 mm, 15 mm, 20 mm and 25 mm. The surface power is relatively small in the distance portion within $30 \leq \theta \leq 150$, and relatively high in the near portion within $240 \leq \theta \leq 300$.

Figure 5:
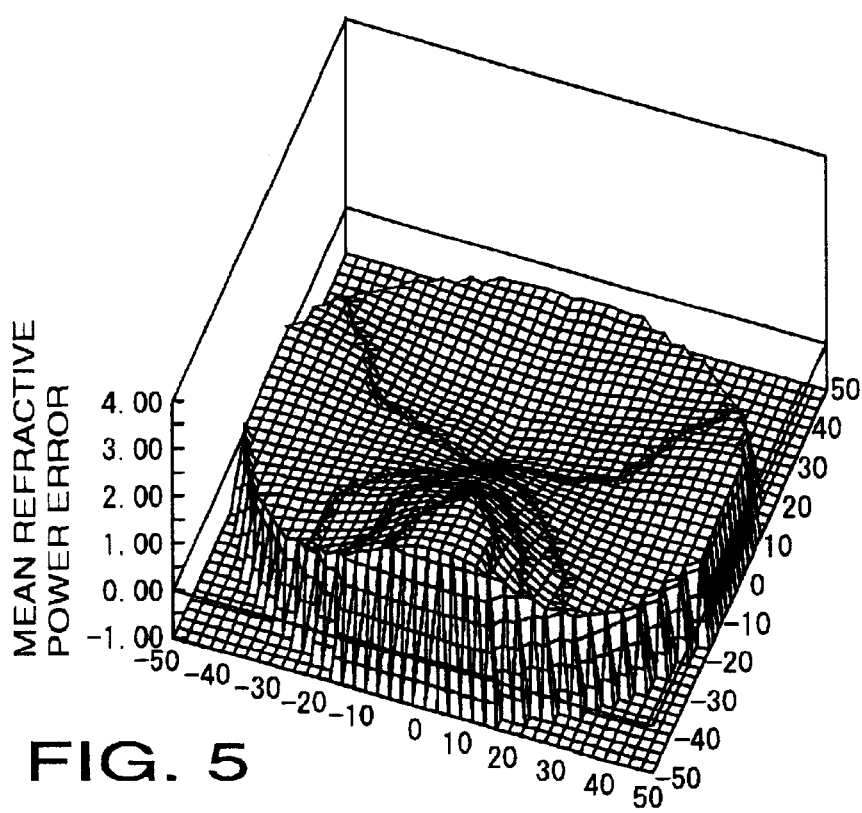
FIG. 5 is a three-dimension graph showing a mean refractive power error of the reference lens for the first embodiment.
Figure 6:
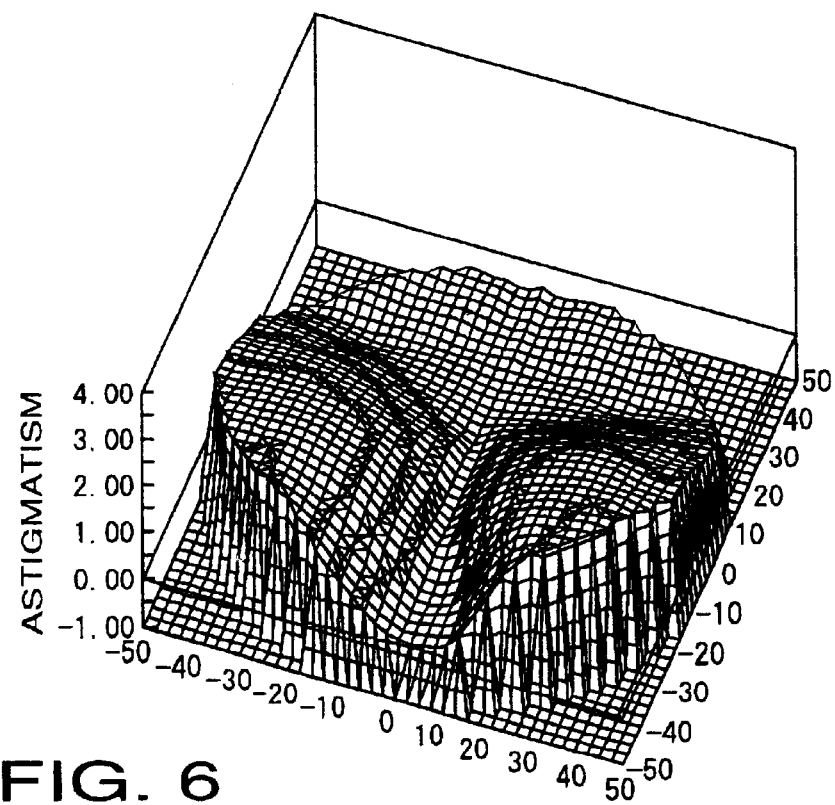
FIG. 6 is a three-dimension graph showing astigmatism of the reference lens for the first embodiment.

FIGS. 5 and 6 are three-dimensional graphs showing transmitting optical performances of the reference lens corresponding to the first embodiment. FIG. 5 shows a mean refractive power error and FIG. 6 shows astigmatism. In the graphs, plane coordinates represent the angle of visual axis (unit: degree) in the vertical and horizontal directions, respectively, and the vertical axis represents amount of aberration (unit: D). The reference lens is well corrected in terms of the aberrations.

Next, the lens of the first comparative example will be described. The lens of the first comparative example is formed by tilting the front and back surfaces of the reference lens relatively to each other with maintaining the shapes thereof so that a prescribed prismatic effect of PRS 3.00Δ and BASE 180° for correcting heterophoria is introduced. The center thickness T is modified to 3.48 mm to maintain the edge thickness.

Figure 7:
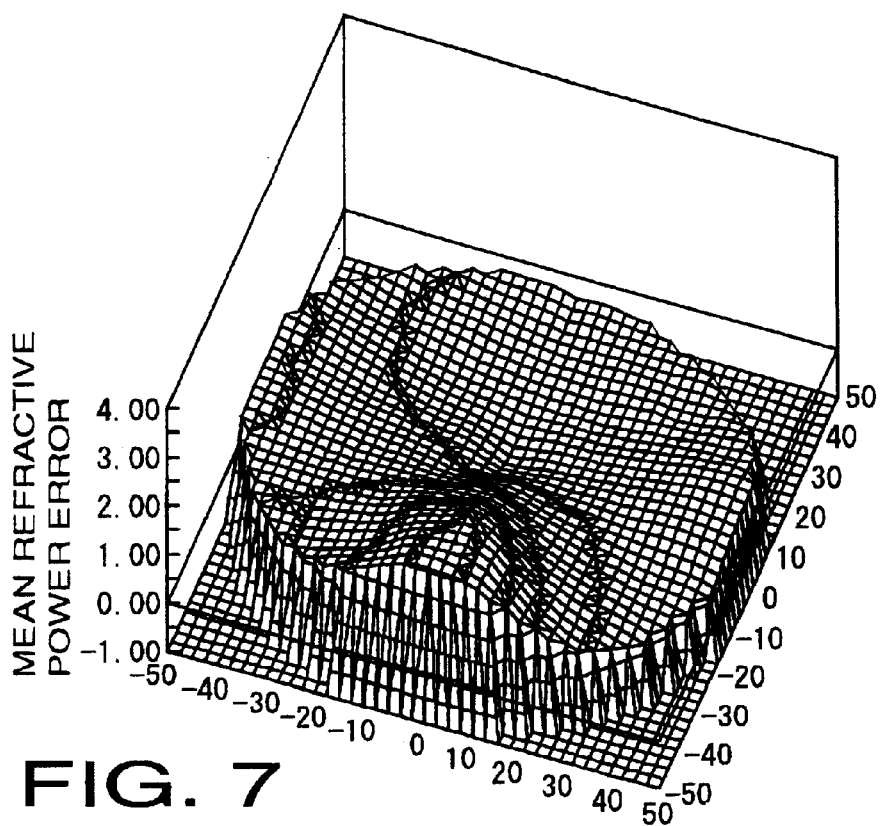
FIG. 7 is a three-dimension graph showing a mean refractive power error of a lens of a first comparative example.
Figure 8:
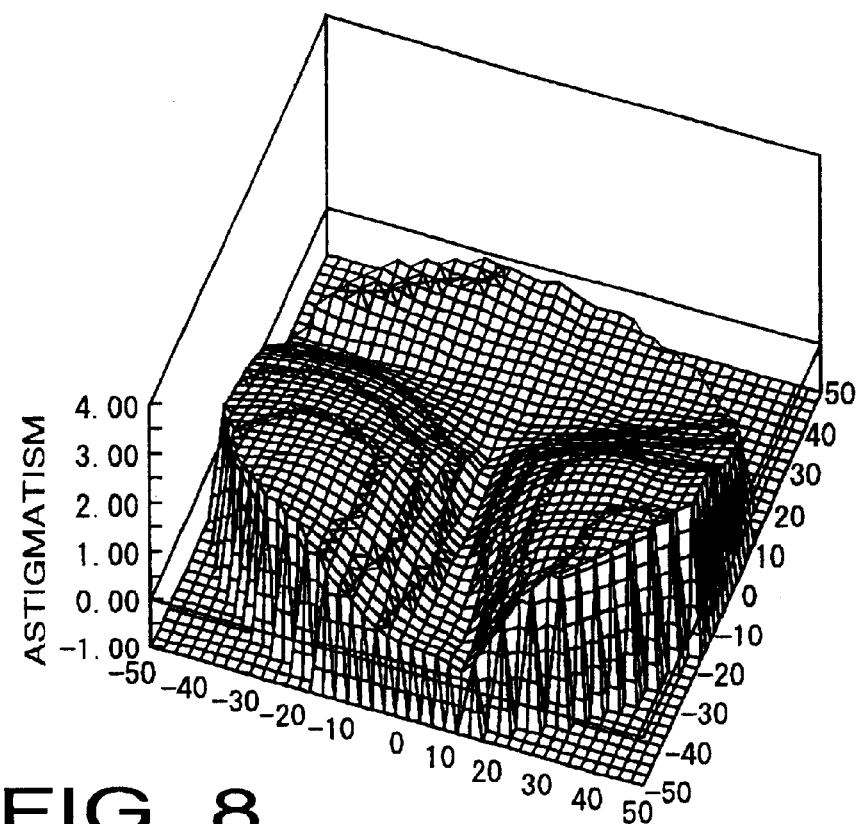
FIG. 8 is a three-dimension graph showing astigmatism of the lens of the first comparative example.

FIGS. 7 and 8 are three-dimensional graphs showing transmitting optical performances of the lens according to the first comparative example. FIG. 7 shows a mean refractive power error and FIG. 8 shows astigmatism. Comparing FIGS. 7 and 8 with FIGS. 5 and 6, it is understood that the optical performance of the first comparative example is lower than that of the reference lens.

The progressive-power spectacle lens according to the first embodiment is designed such that the prescribed prismatic effect of PRS 3.00Δ and BASE 180° for correcting heterophoria is introduced into the reference lens. The progressive-power spectacle lens according to the first embodiment is designed by changing the shape of the progressive-power surface of the reference lens, tilting the front and back surfaces relatively to introduce the prescribed prismatic effect and changing the center thickness T to 3.61 mm to maintain the edge thickness.

Figures 9, 10:
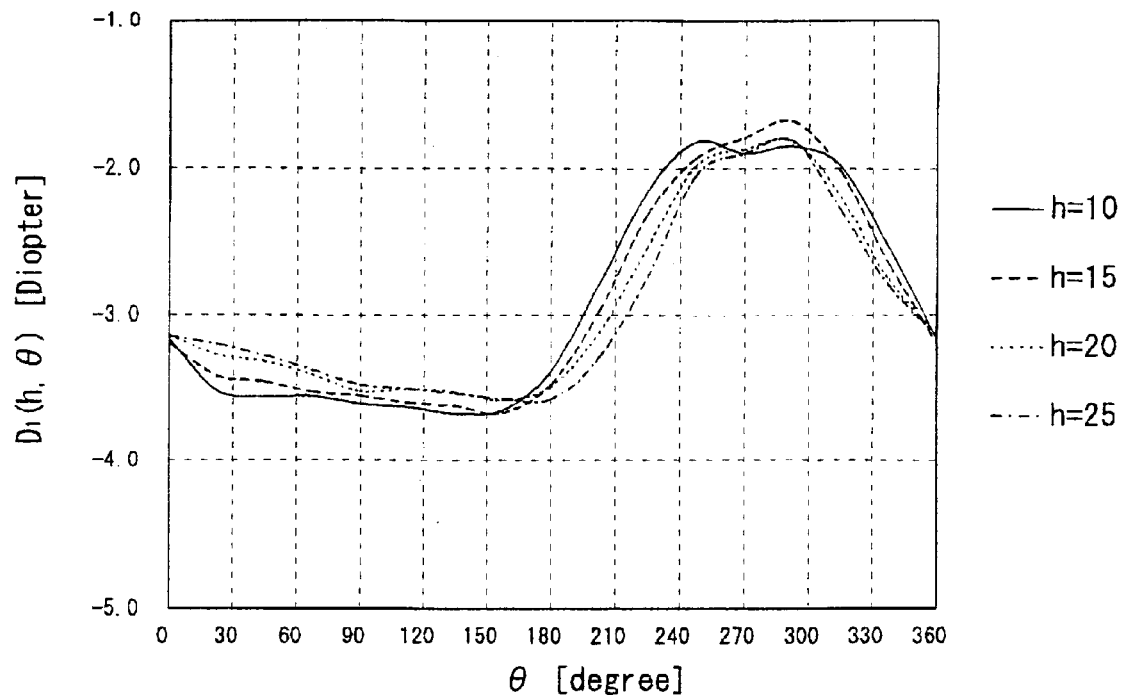
FIG. 9 is a table showing distribution of a surface power of the progressive-power surface of an actual lens of the first embodiment.
FIG. 10 is a graph showing variations of the surface powers of the progressive-power surface of the actual lens of the first embodiment.

The table in FIG. 9 indicates distribution of the surface power $D_1(h, \theta)$ of the progressive-power back surface according to the first embodiment at a point $(h, \theta)$ on the back surface. FIG. 10 is a graph showing a relationship between the surface powers $D_1(h, \theta)$ and the angle θ for each of the distances h=10 mm, 15 mm, 20 mm and 25 mm.

Figures 11, 12:
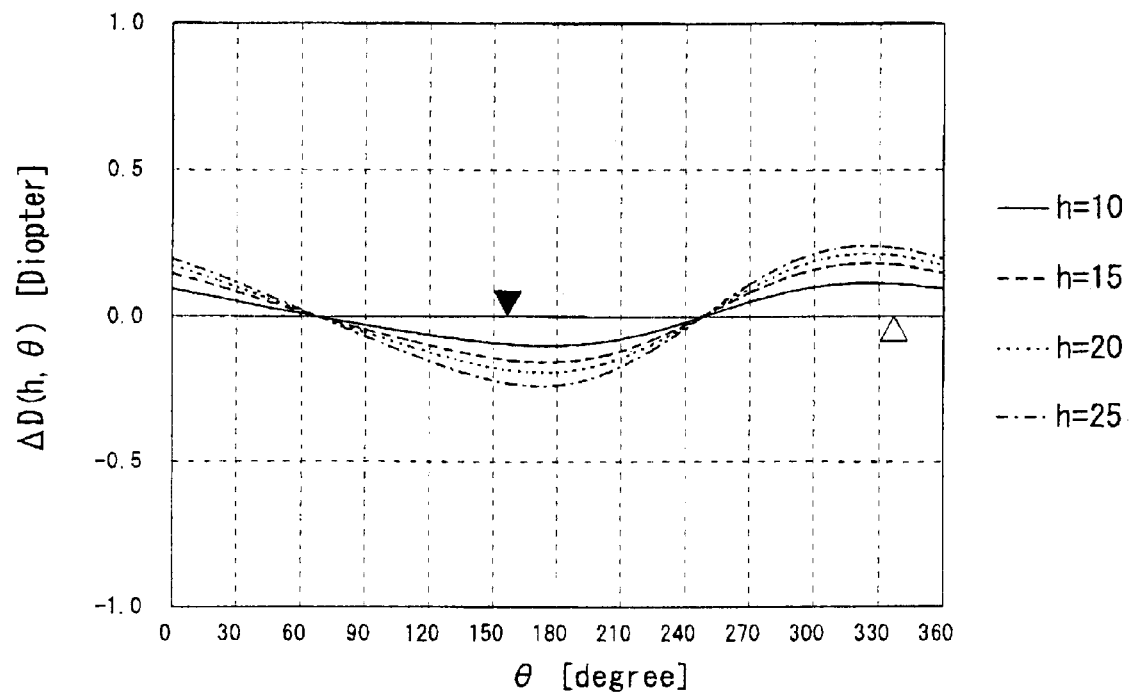
FIG. 11 is a table showing distribution of the difference between surface powers of the progressive-power surfaces of the actual lens and the reference lens according to the first embodiment.
FIG. 12 is a graph showing variations of the difference between the surface powers of the progressive-power surface of the actual lens and the reference lens according to the first embodiment.

FIGS. 11 and 12 illustrate how the reference lens is modified to form the progressive-power surface according to the first embodiment reference lens. The table in FIG. 11 indicates distribution of the difference $\Delta D(h, \theta)$ between the surface power $D_1(h, \theta)$ of the actual progressive-power spectacle lens according to the first embodiment and the surface power $D_0(h, \theta)$ of the reference lens. FIG. 12 is a graph showing a relationship between the difference $\Delta D(h, \theta)$ of the surface power and the angle θ for each of the distances h=10 mm, 15 mm, 20 mm and 25 mm. In FIG. 12, the black triangle indicates the prism base setting of the differential prism and the white triangle indicates the apex of the differential prism.

The prismatic power ΔP of the differential prism is equal to 3.23Δ and the prism base setting ΔB thereof is equal to 158°. As shown in FIG. 12, the difference $\Delta D(h, \theta)$ of the surface powers is negative in the base region $113 \leq \theta \leq 203$ and positive in the apex region $293 \leq \theta \leq 383$ (one turn+23°) for all of the distances h=10 mm, 15 mm, 20 mm and 25 mm. That is, the lens of the first embodiment satisfies the conditions (1) and (2).

Figure 13:
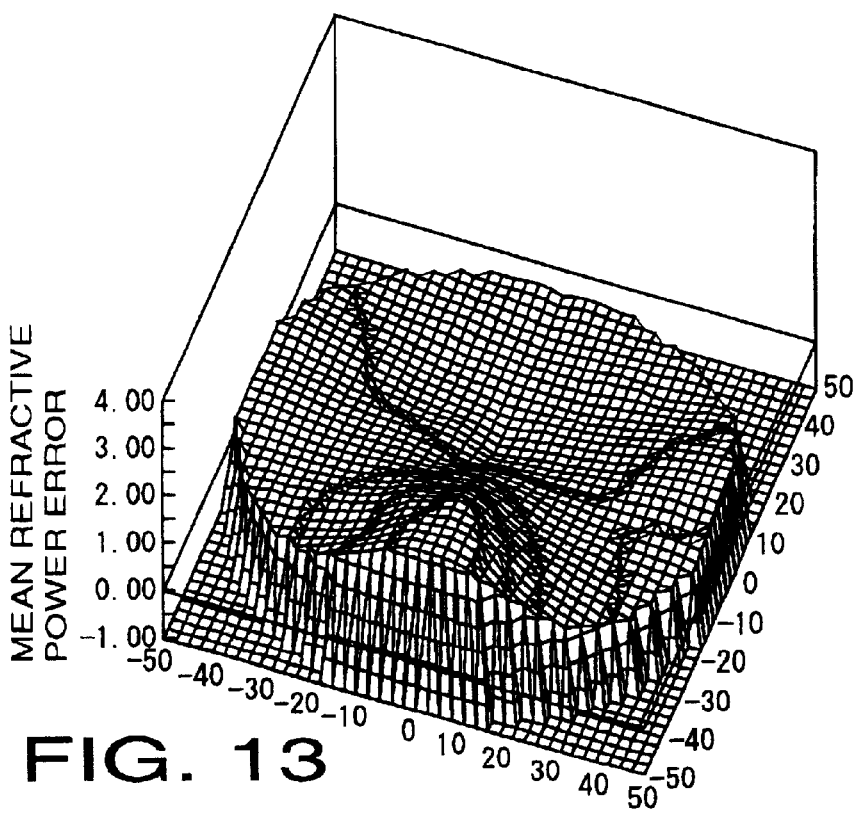
FIG. 13 is a three-dimension graph showing a mean refractive power error of the actual lens of the first embodiment.
Figure 14:
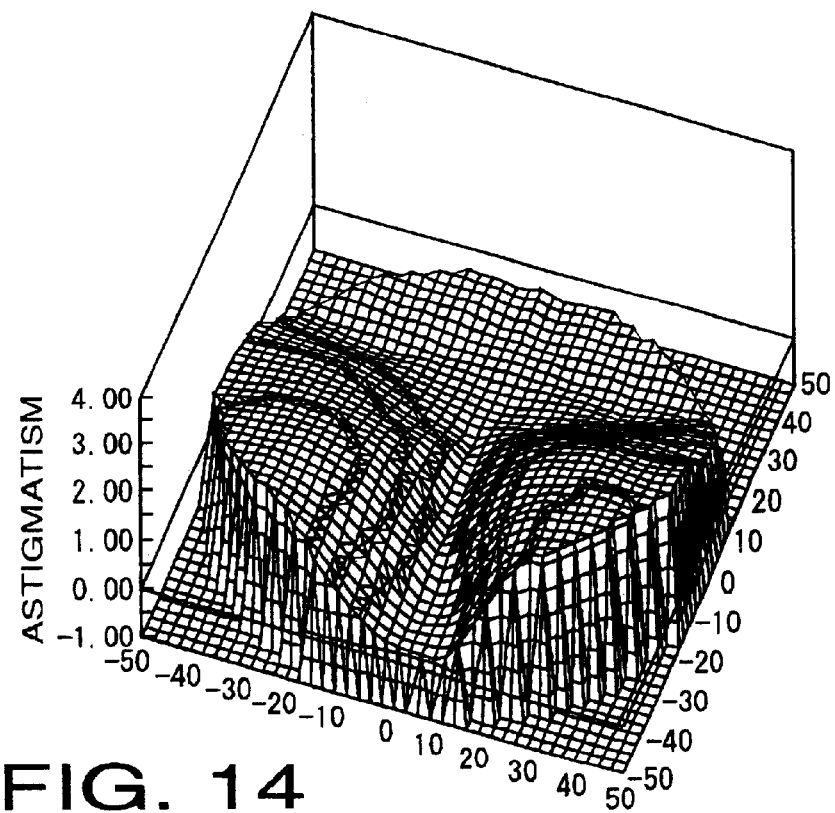
FIG. 14 is a three-dimension graph showing astigmatism of the actual lens of the first embodiment.

FIGS. 13 and 14 are three-dimensional graphs showing transmitting optical performances of the actual lens according to the first embodiment. FIG. 13 shows a mean refractive power error and FIG. 14 shows astigmatism. Comparing FIGS. 13 and 14 with FIGS. 5 to 8, it is understood that the optical performance of the first embodiment is improved with respect to the lens according to the first comparative example and is close to that of the reference lens.

Second Embodiment

In the second embodiment and the second comparative example corresponding to the second embodiment, the progressive-power spectacle lens has a spherical front surface and a progressive-power back surface and has no cylindrical power for correcting astigmatism. The reference lens corresponding to the second embodiment is identical to that corresponding to the first embodiment.

The lens according to the second comparative example will be described. The lens according to the second comparative example is formed by tilting the front and back surfaces of the reference lens relatively to each other with maintaining the shapes thereof to introduce a prescribed prismatic effect of PRS 3.00Δ and BASE 90° for correcting heterophoria. The center thickness T is modified to 4.17 mm to maintain the edge thickness.

Figure 15:
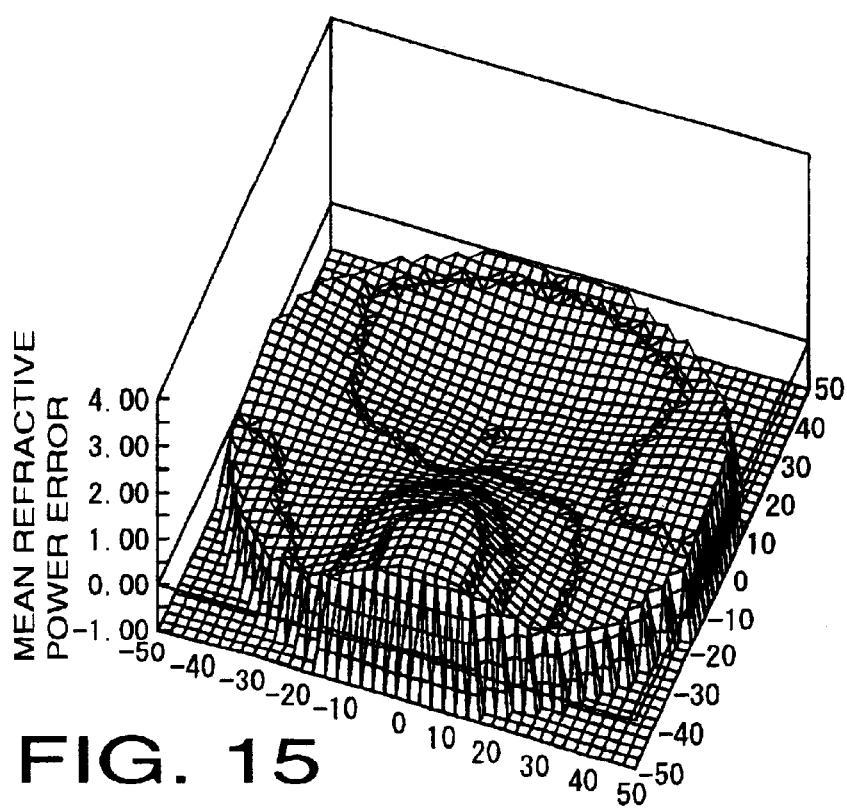
FIG. 15 is a three-dimension graph showing a mean refractive power error of a lens of a second comparative example.
Figure 16:
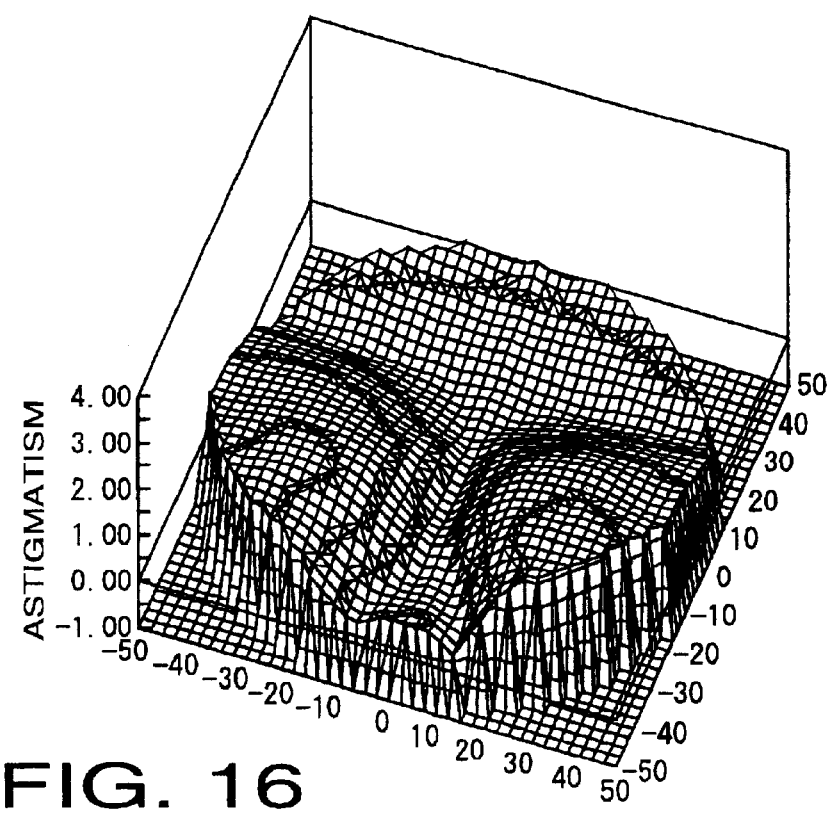
FIG. 16 is a three-dimension graph showing astigmatism of the lens of the second comparative example.

FIGS. 15 and 16 are three-dimensional graphs showing transmitting optical performances of the lens according to the second comparative example. FIG. 15 shows a mean refractive power error and FIG. 16 shows astigmatism. Comparing FIGS. 15 and 16 with FIGS. 5 and 6, it is understood that the optical performance of the second comparative example is lower than that of the reference lens.

The progressive-power spectacle lens according to the second embodiment is designed such that the prescribed prismatic effect of PRS 3.00Δ and BASE 90° for correcting heterophoria is introduced into the reference lens. The progressive-power spectacle lens according to the second embodiment is designed by changing the shape of the progressive-power surface of the reference lens, tilting the front and back surfaces relatively to introduce the prescribed prismatic effect, and changing the center thickness T to 4.37 mm to maintain the edge thickness.

Figures 17, 18:
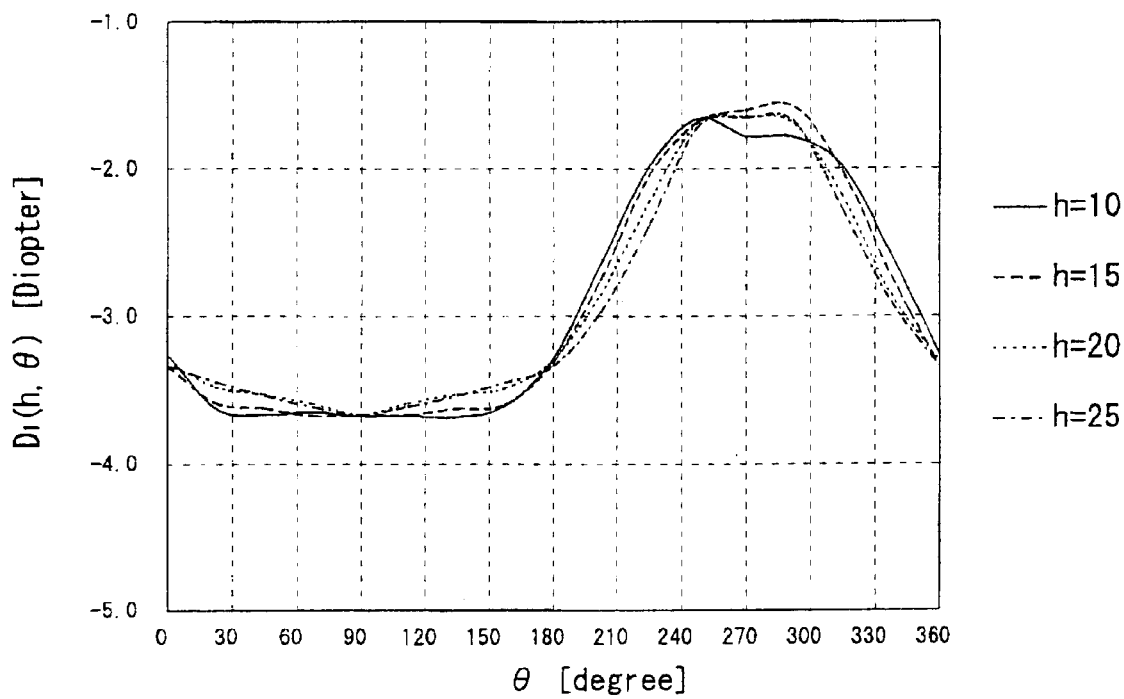
FIG. 17 is a table showing distribution of a surface power of the progressive-power surface of an actual lens of the second embodiment.
FIG. 18 is a graph showing variations of the surface powers of the progressive-power surface of the actual lens of the second embodiment.

The table in FIG. 17 indicates distribution of the surface power $D_1(h, \theta)$ of the progressive-power back surface according to the second embodiment. FIG. 18 is a graph showing a relationship between the surface powers $D_1(h, \theta)$ and the angle $\theta$ for each of the distances h=10 mm, 15 mm, 20 mm and 25 mm.

Figures 19, 20:
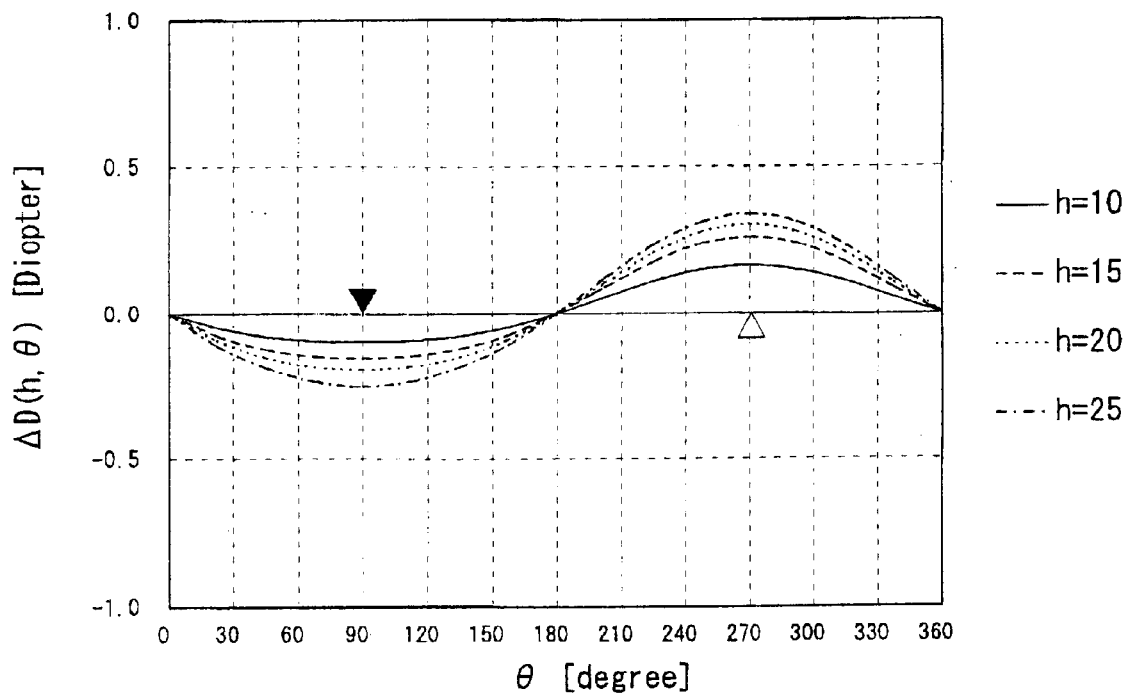
FIG. 19 is a table showing distribution of the difference between surface powers of the progressive-power surfaces of the actual lens and the reference lens according to the second embodiment.
FIG. 20 is a graph showing variations of the difference between the surface powers of the progressive-power surface of the actual lens and the reference lens according to the second embodiment.

FIGS. 19 and 20 illustrate how the reference lens is modified to form the progressive-power surface according to the second embodiment reference lens. The table in FIG. 19 indicates distribution of the difference $\Delta D(h, \theta)$ between the surface power $D_1(h, \theta)$ of the actual progressive-power spectacle lens according to the second embodiment and the surface power $D_0(h, \theta)$ of the reference lens. FIG. 20 is a graph showing a relationship between the difference $\Delta D(h, \theta)$ of the surface powers and the angle $\theta$ for each of the distances h=10 mm, 15 mm, 20 mm and 25 mm.

The prismatic power $\Delta P$ of the differential prism is equal to 4.20Δ and the prism base setting $\Delta B$ thereof is equal to 90°. As shown in FIG. 20, the difference $\Delta D(h, \theta)$ of the surface powers is negative in the base region $45 \leq \theta \leq 135$ and is positive in the apex region in $225 \leq \theta \leq 315$ for all of the distances h=10 mm, 15 mm, 20 mm and 25 mm. That is, the lens of the second embodiment satisfies the conditions (1) and (2).

Figure 21:
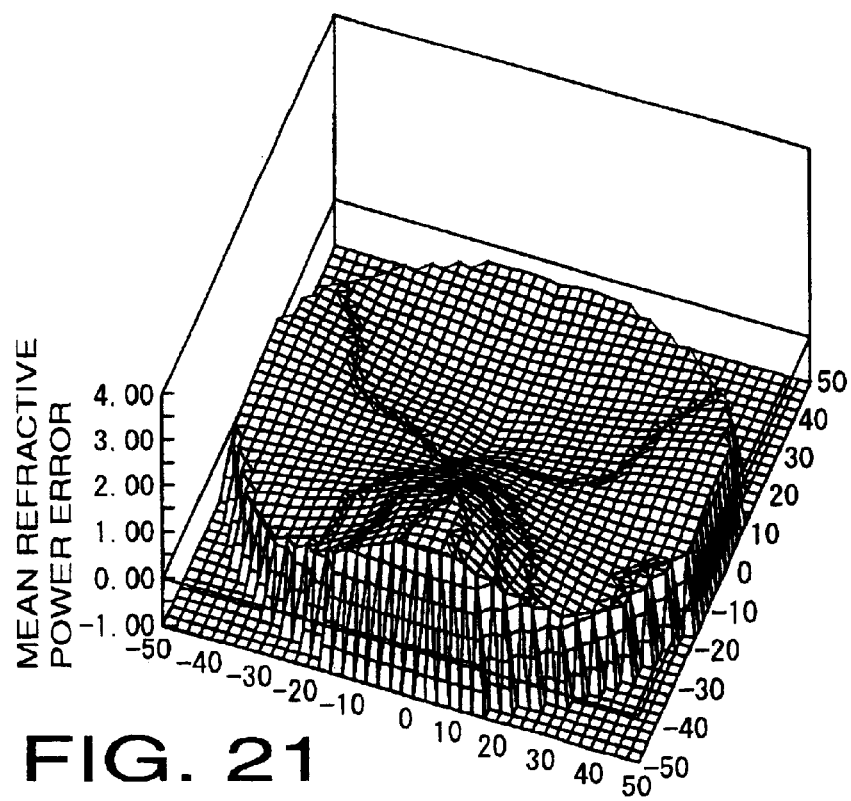
FIG. 21 is a three-dimension graph showing a mean refractive power error of the actual lens of the second embodiment.
Figure 22:
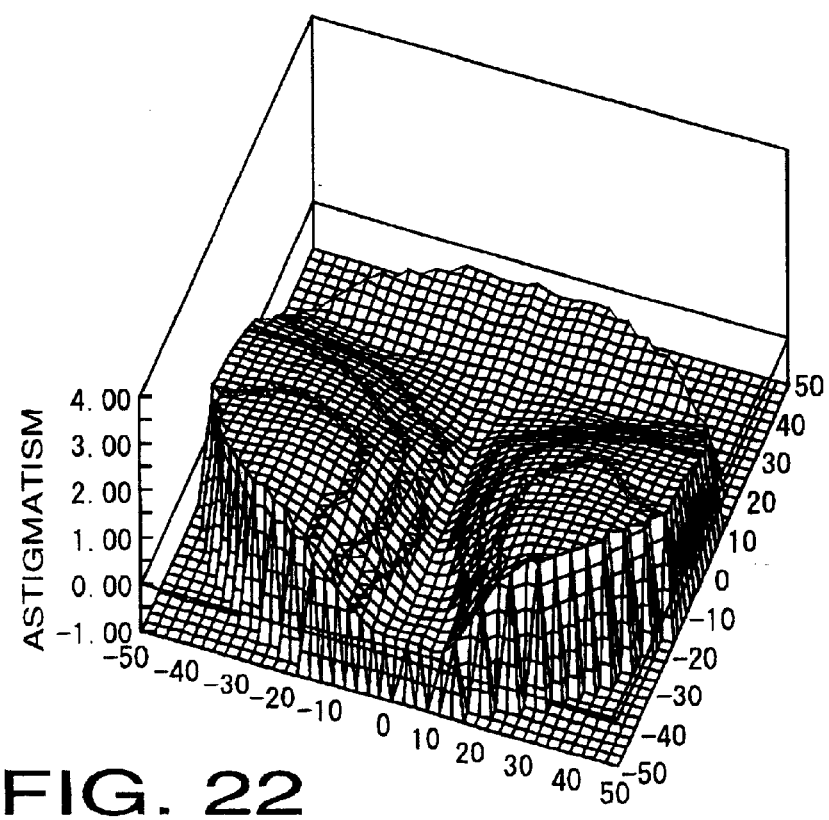
FIG. 22 is a three-dimension graph showing astigmatism of the actual lens of the second embodiment.

FIGS. 21 and 22 are three-dimensional graphs showing transmitting optical performances of the actual lens according to the second embodiment. FIG. 21 shows a mean refractive power error and FIG. 22 shows astigmatism. Comparing FIGS. 21 and 22 with FIGS. 5, 6, 15 and 16, it is understood that the optical performance of the second embodiment is improved with respect to the lens of the second comparative example and is close to that of the reference lens.

Third Embodiment

In the third embodiment and the third comparative example corresponding to the third embodiment, the progressive-power spectacle lens has a spherical front surface and a progressive-power back surface and has no cylindrical power for correcting astigmatism. The reference lens corresponding to the third embodiment, whose specification is shown in TABLE 2, has no prescribed prismatic effect for correcting heterophoria, while the reference lens has an unprescribed prismatic effect caused by the prism thinning.

TABLE 2

| SPH | −4.00D | $D_1$ | 1.80 D |
|---|---|---|---|
| CYL | 0.00D | $D_{2F}$ | 5.80 D |
| AX | — | T | 1.10 mm |
| ADD | 2.00D | DIA | 75 mm |
| PRS | 0.84Δ | — | — |
| BASE | 270° | — | — |

Figures 23, 24:
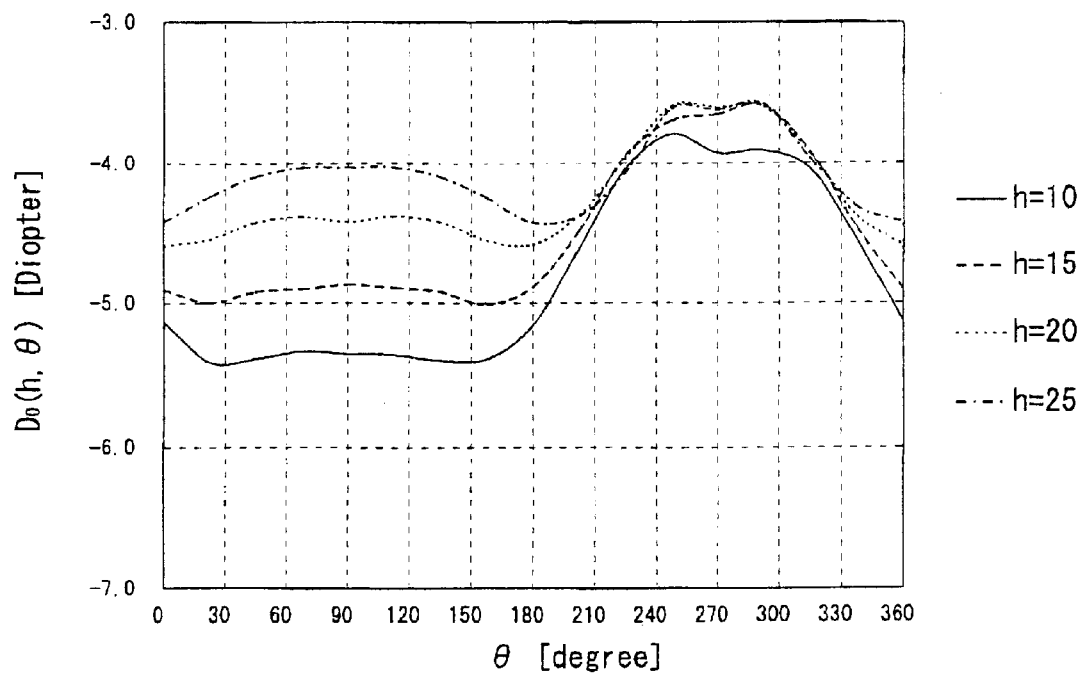
FIG. 23 is a table showing distribution of a surface power of the progressive-power surface of a reference lens for a third embodiment.
FIG. 24 is a graph showing variations of the surface powers of the progressive-power surface of the reference lens for the third embodiment.

The table in FIG. 23 indicates distribution of the surface power $D_0(h, \theta)$ of the progressive-power back surface of the reference lens corresponding to the third embodiment at a point $(h, \theta)$. FIG. 24 is a graph showing a relationship between the surface powers $D_0(h, \theta)$ and the angle $\theta$ for each of the distances h=10 mm, 15 mm, 20 mm and 25 mm. The surface power is relatively low in the distance portion within $30 \leq \theta \leq 150$, and relatively high in the near portion within $240 \leq \theta \leq 300$.

Figure 25:
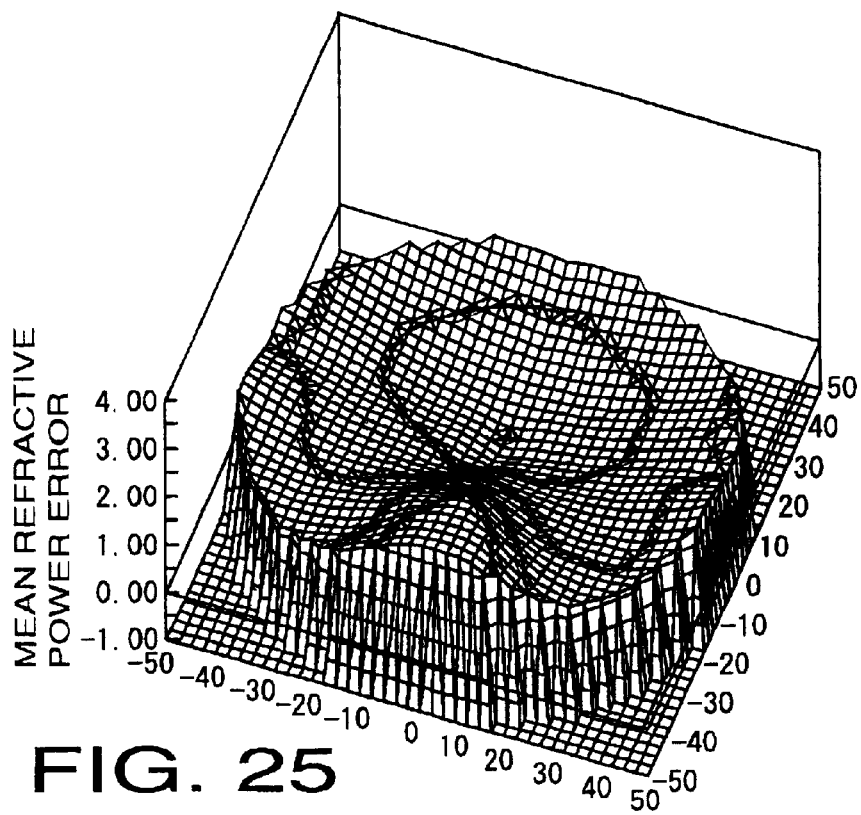
FIG. 25 is a three-dimension graph showing a mean refractive power error of the reference lens for the third embodiment.
Figure 26:
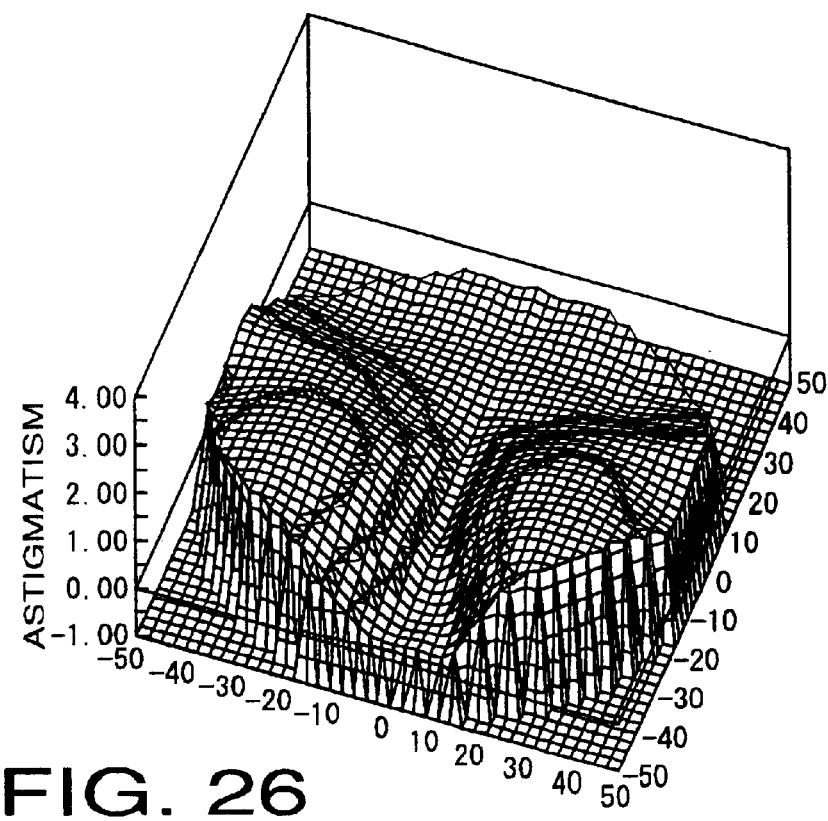
FIG. 26 is a three-dimension graph showing astigmatism of the reference lens for the third embodiment.

FIGS. 25 and 26 are three-dimensional graphs showing transmitting optical performances of the reference lens corresponding to the third embodiment. FIG. 25 shows a mean refractive power error and FIG. 26 shows astigmatism.

Next, the lens of the third comparative example will be described. The lens of the third comparative example is formed by tilting the front and back surfaces of the reference lens relatively to each other with maintaining the shapes thereof so that a prescribed prismatic effect of PRS 3.00Δ and BASE 0° for correcting heterophoria is introduced.

Figure 27:
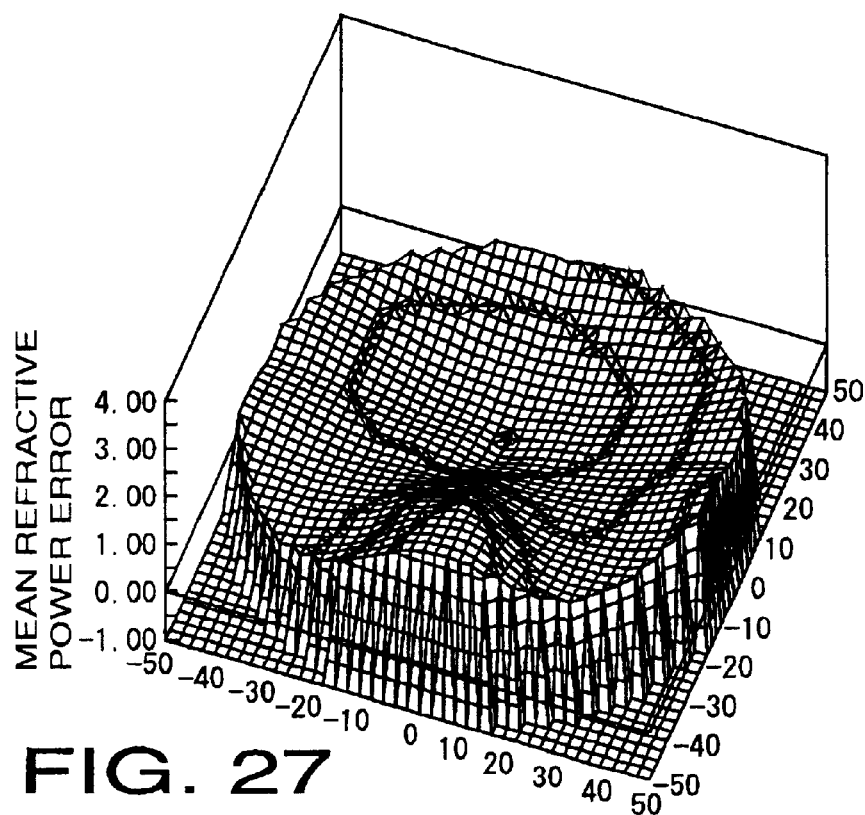
FIG. 27 is a three-dimension graph showing a mean refractive power error of a lens of a third comparative example.
Figure 28:
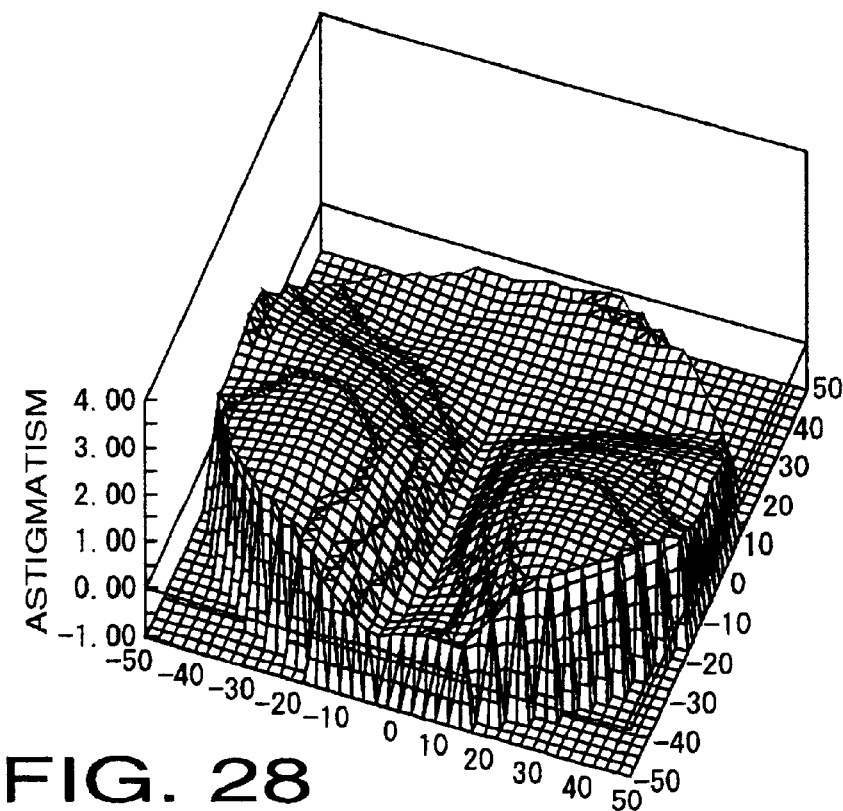
FIG. 28 is a three-dimension graph showing astigmatism of the lens of the third comparative example.

FIGS. 27 and 28 are three-dimensional graphs showing transmitting optical performances of the lens of the third comparative example. FIG. 27 shows a mean refractive power error and FIG. 28 shows astigmatism. Comparing FIGS. 27 and 28 with FIGS. 25 and 26, it is understood that the optical performance of the third comparative example is lower than that of the reference lens.

The progressive-power spectacle lens according to the third embodiment is designed such that the prescribed prismatic effect of PRS 3.00Δ and BASE 0° for correcting heterophoria is introduced into the reference lens. The progressive-power spectacle lens according to the third embodiment is designed by changing the shape of the progressive-power surface of the reference lens, and tilting the front and back surfaces relatively to each other to introduce the prescribed prismatic effect.

Figures 29, 30:
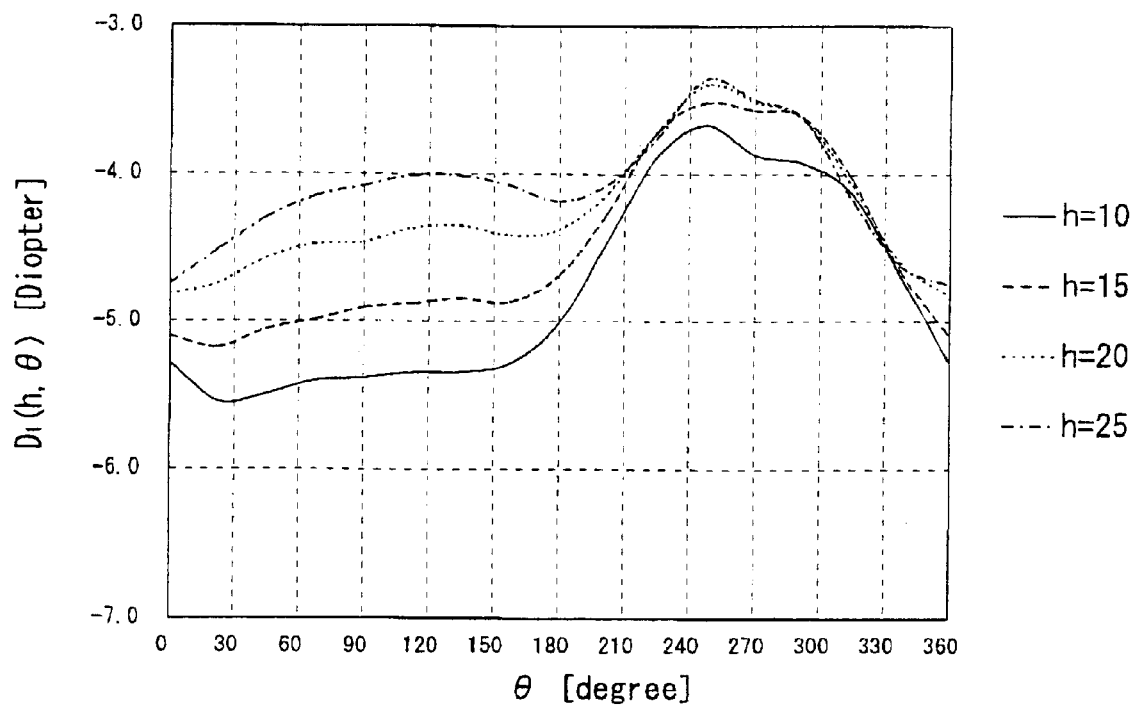
FIG. 29 is a table showing distribution of a surface power of the progressive-power surface of an actual lens of the third embodiment.
FIG. 30 is a graph showing variations of the surface powers of the progressive-power surface of the actual lens of the third embodiment.

The table in FIG. 29 indicates distribution of the surface power $D_1(h, \theta)$ of the progressive-power back surface according to the third embodiment at a point $(h, \theta)$. FIG. 30 is a graph showing a relationship between the surface powers $D_1(h, \theta)$ and the angle $\theta$ for each of the distances h=10 mm, 15 mm, 20 mm and 25 mm.

Figures 31, 32:
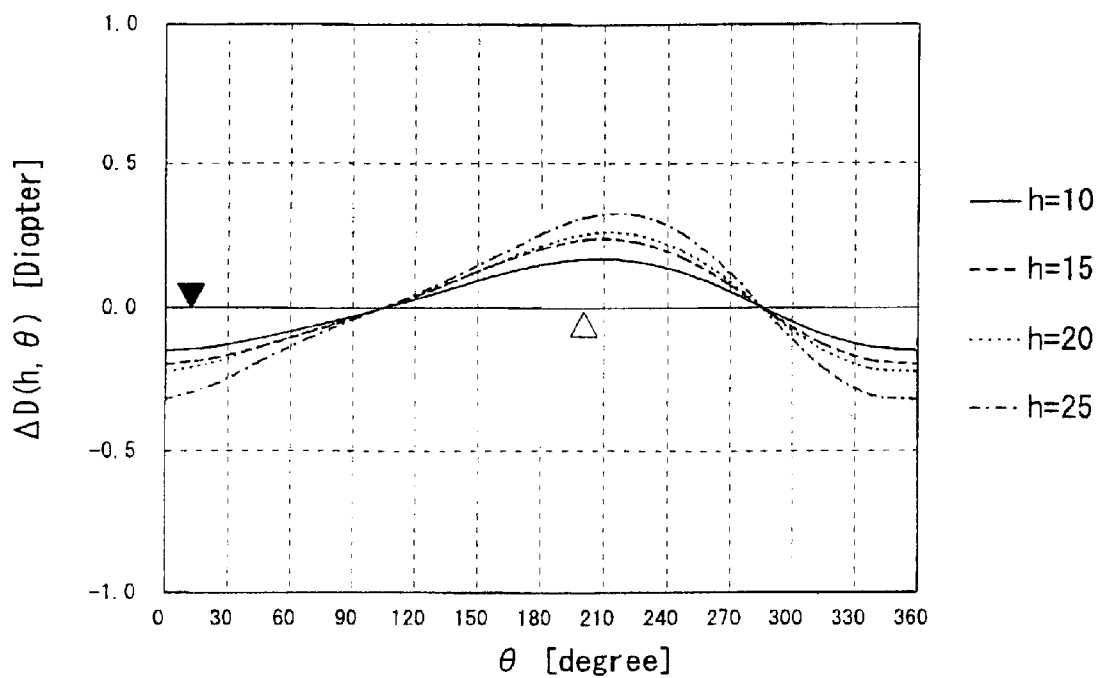
FIG. 31 is a table showing distribution of the difference between surface powers of the progressive-power surfaces of the actual lens and the reference lens according to the third embodiment.
FIG. 32 is a graph showing variations of the difference between the surface powers of the progressive-power surface of the actual lens and the reference lens according to the third embodiment.

FIGS. 31 and 32 illustrate how the reference lens is modified to form the progressive-power surface according to the third embodiment reference lens. The table in FIG. 31 indicates distribution of the difference $\Delta D(h, \theta)$ between the surface powers $D_1(h, \theta)$ of the actual progressive-power spectacle lens according to the third embodiment and the surface power $D_0(h, \theta)$ of the reference lens. FIG. 32 is a graph showing a relationship between the difference $\Delta D(h, \theta)$ of the surface powers and the angle $\theta$ for each of the distances h=10 mm, 15 mm, 20 mm and 25 mm.

The prismatic power $\Delta P$ of the differential prism is equal to 3.12$\Delta$ and the prism base setting $\Delta B$ thereof is equal to 16°. As shown in FIG. 32, the difference $\Delta D(h, \theta)$ of the surface powers is negative in the base region $-29 \leq \theta \leq 61$ and is positive in the apex region $151 \leq \theta \leq 241$ for all of the distances h=10 mm, 15 mm, 20 mm and 25 mm. That is, the lens of the third embodiment satisfies the conditions (1) and (2).

Figure 33:
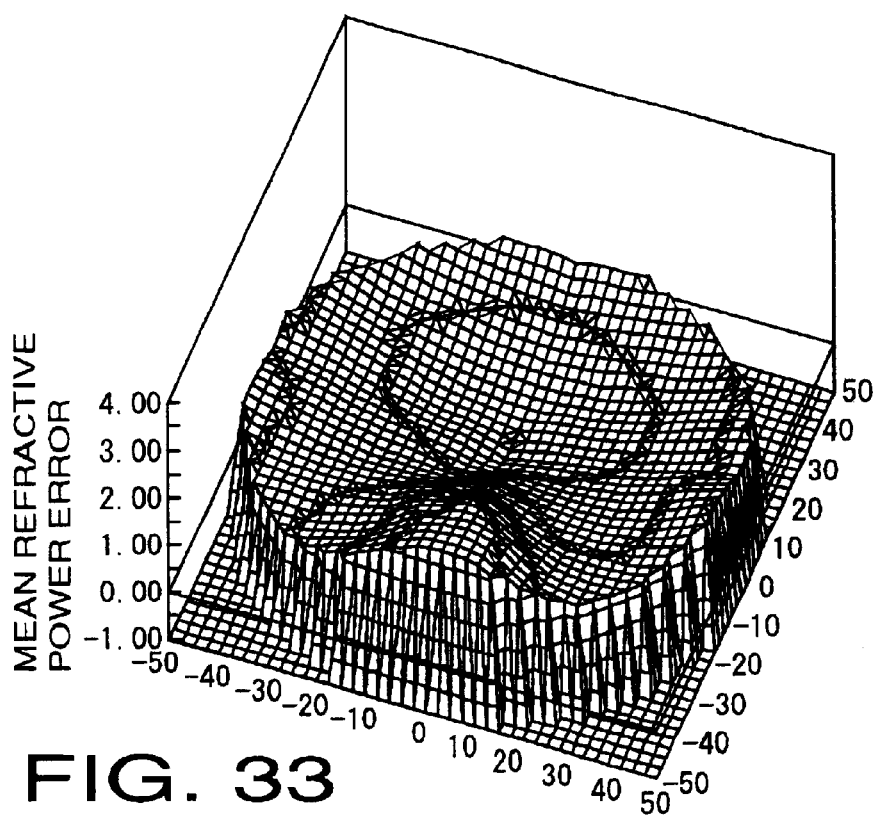
FIG. 33 is a three-dimension graph showing a mean refractive power error of the actual lens of the third embodiment.
Figure 34:
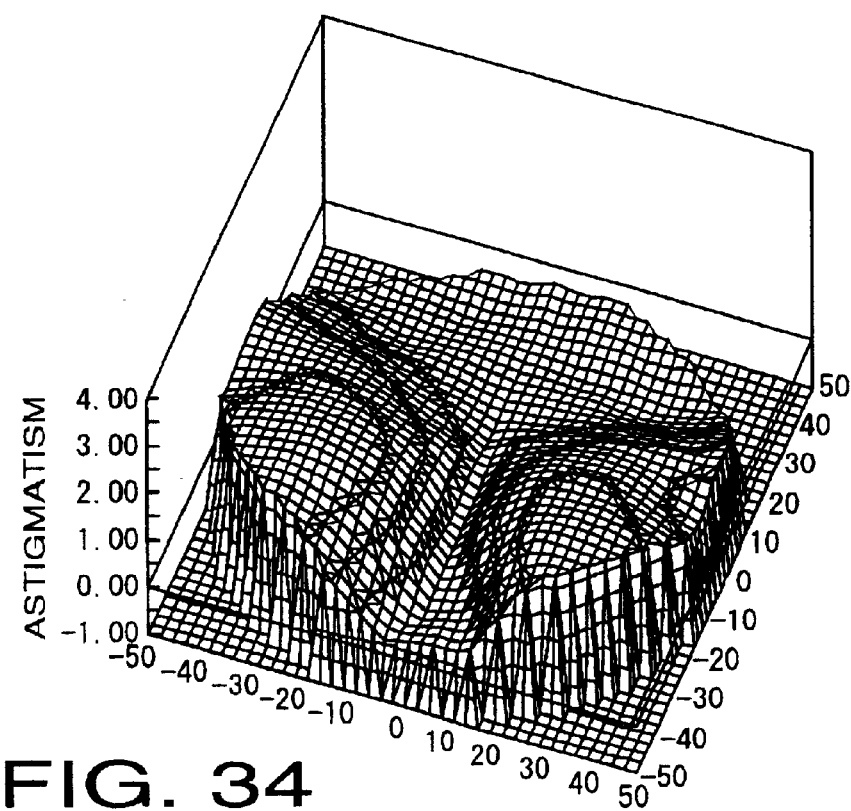
FIG. 34 is a three-dimension graph showing astigmatism of the actual lens of the third embodiment.

FIGS. 33 and 34 are three-dimensional graphs showing transmitting optical performances of the actual lens according to the third embodiment. FIG. 33 shows a mean refractive power error and FIG. 34 shows astigmatism. Comparing FIGS. 33 and 34 with FIGS. 25 to 28, it is understood that the optical performance of the third embodiment is improved with respect to the lens according to the third comparative example and is close to that of the reference lens.

Fourth Embodiment

In the fourth embodiment and the fourth comparative example corresponding of the fourth embodiment, the progressive-power spectacle lens has a spherical front surface and a progressive-power back surface and has no cylindrical power for correcting astigmatism. The reference lens corresponding to the fourth embodiment, whose specification is shown in TABLE 3, has no prescribed prismatic effect for correcting heterophoria, while it has an unprescribed prismatic effect caused by the prism thinning.

TABLE 3

| SPH | 4.00D | $D_1$ | 5.32 D |
|---|---|---|---|
| CYL | 0.00D | $D_{2F}$ | 1.39 D |
| AX | — | T | 4.36 mm |
| ADD | 2.00D | DIA | 65 mm |
| PRS | 1.15$\Delta$ | — | — |
| BASE | 270° | — | — |

Figures 35, 36:
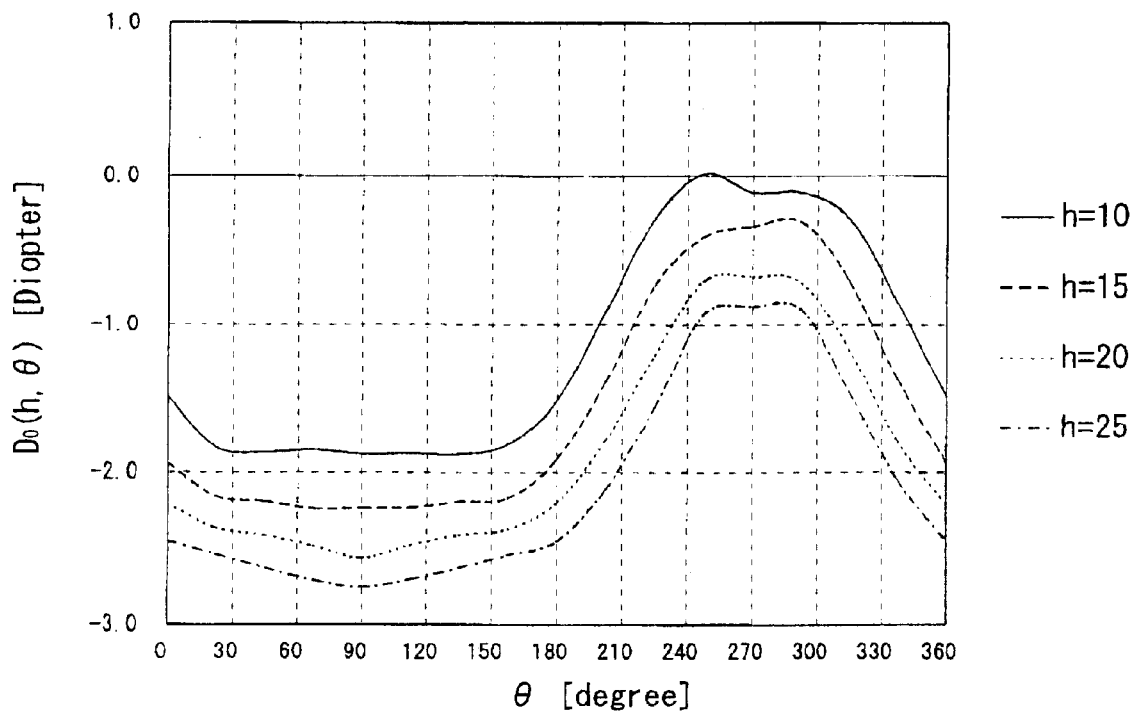
FIG. 35 is a table showing distribution of a surface power of the progressive-power surface of a reference lens for a fourth embodiment.
FIG. 36 is a graph showing variations of the surface powers of the progressive-power surface of the reference lens for the fourth embodiment.

The table in FIG. 35 indicates distribution of the surface power $D_0(h, \theta)$ of the progressive-power back surface of the reference lens corresponding to the fourth embodiment at a point $(h, \theta)$. FIG. 36 is a graph showing a relationship between the surface powers $D_0(h, \theta)$ and the angle $\theta$ for each of the distances h=10 mm, 15 mm, 20 mm and 25 mm. The surface power is relatively low in the distance portion within $30 \leq \theta \leq 150$ and relatively high in the near portion within $240 \leq \theta \leq 300$.

Figure 37:
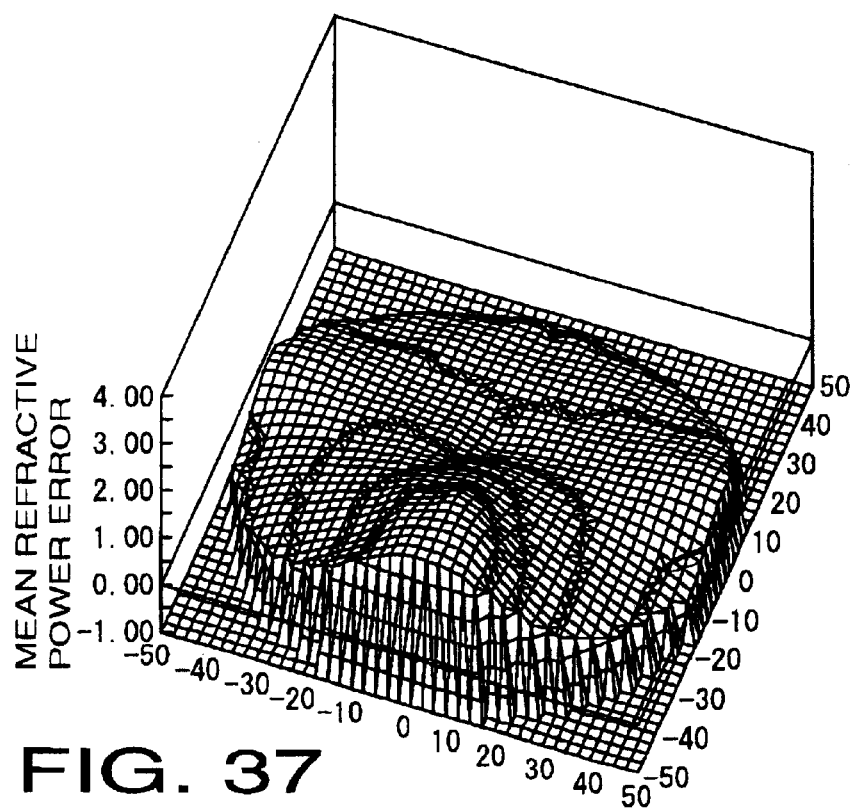
FIG. 37 is a three-dimension graph showing a mean refractive power error of the reference lens for the fourth embodiment.
Figure 38:
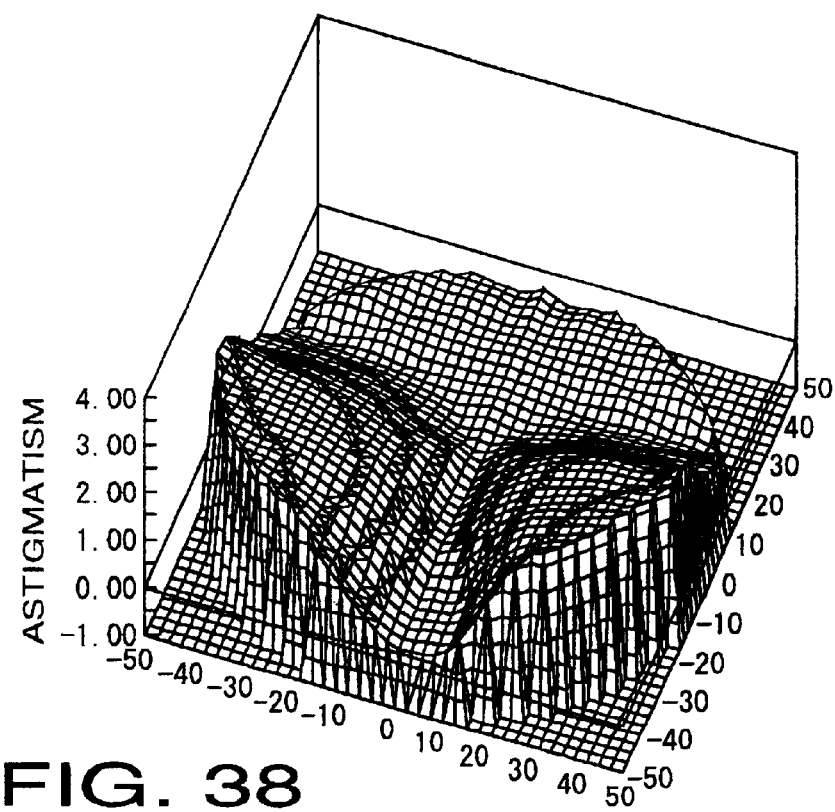
FIG. 38 is a three-dimension graph showing astigmatism of the reference lens for the fourth embodiment.

FIGS. 37 and 38 are three-dimensional graphs showing transmitting optical performances of the reference lens corresponding to the fourth embodiment. FIG. 37 shows a mean refractive power error and FIG. 38 shows astigmatism.

Next, the lens of the fourth comparative example will be described. The lens of the fourth comparative example is formed by tilting the front and back surfaces of the reference lens relatively with maintaining the shapes thereof so that a prescribed prismatic effect of PRS 3.00$\Delta$ and BASE 90° for correcting heterophoria is introduced. The center thickness T is modified to 6.36 mm to maintain the edge thickness.

Figure 39:
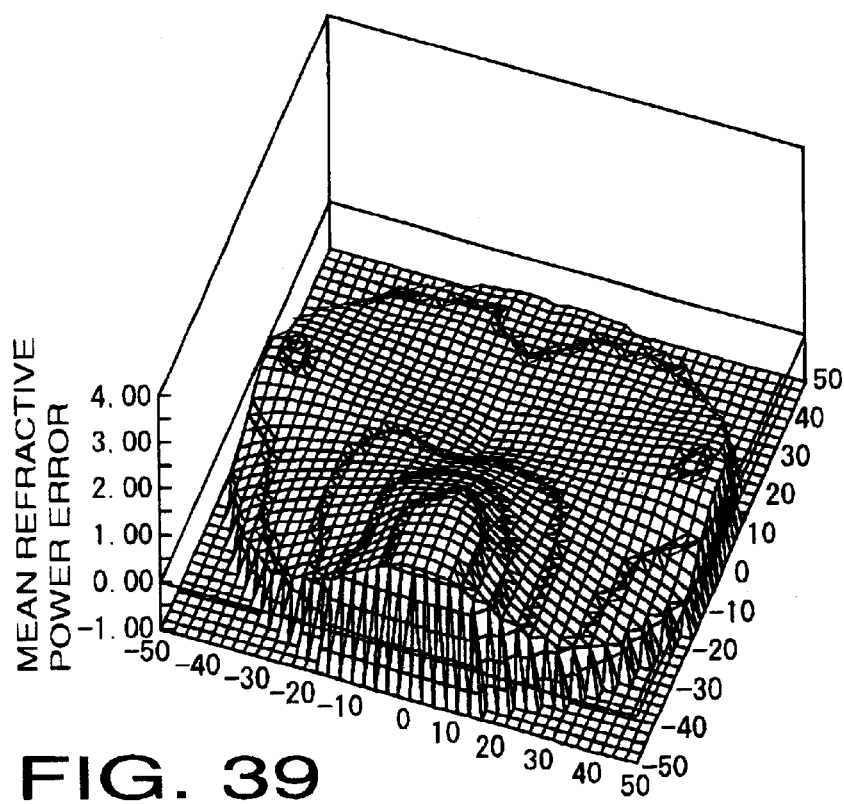
FIG. 39 is a three-dimension graph showing a mean refractive power error of a lens of a fourth comparative example.
Figure 40:
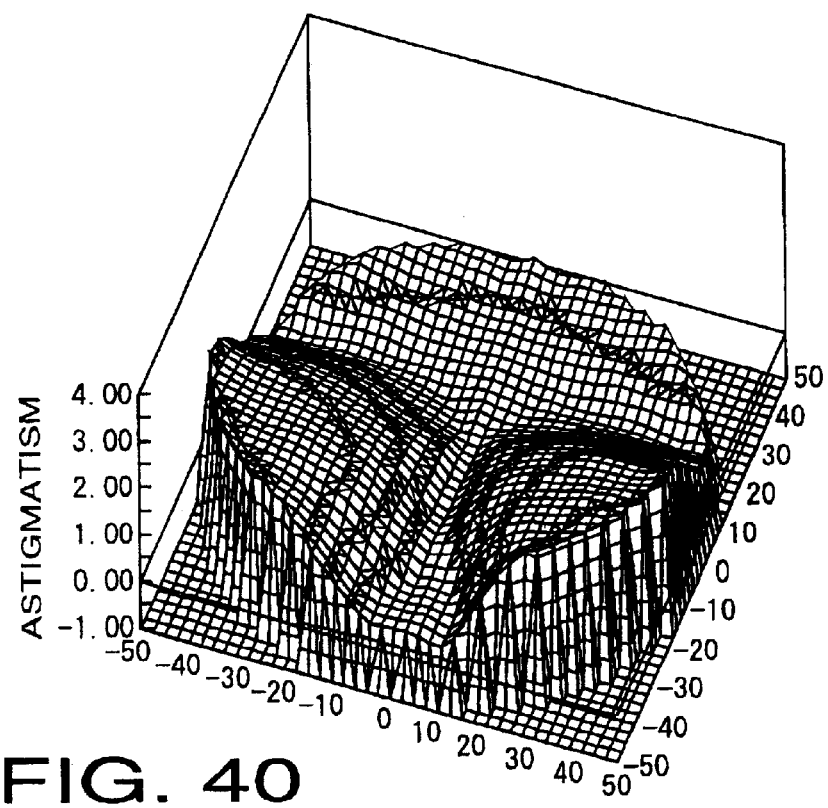
FIG. 40 is a three-dimension graph showing astigmatism of the lens of the fourth comparative example.

FIGS. 39 and 40 are three-dimensional graphs showing transmitting optical performances of the lens of the fourth comparative example; FIG. 39 shows a mean refractive power error and FIG. 40 shows astigmatism. Comparing FIGS. 39 and 40 with FIGS. 37 and 38, it is understood that the optical performance of the fourth comparative example is lower than that of the reference lens.

The progressive-power spectacle lens according to the fourth embodiment is designed such that the prescribed prismatic effect of PRS 3.00$\Delta$ and BASE 90° for correcting heterophoria is introduced into the reference lens. The progressive-power spectacle lens according to the fourth embodiment is designed by changing the shape of the progressive-power surface of the reference lens, tilting the front and back surfaces relatively to introduce the prescribed prismatic effect, and changing the center thickness T to 6.45 mm to maintain the edge thickness.

Figures 41, 42:
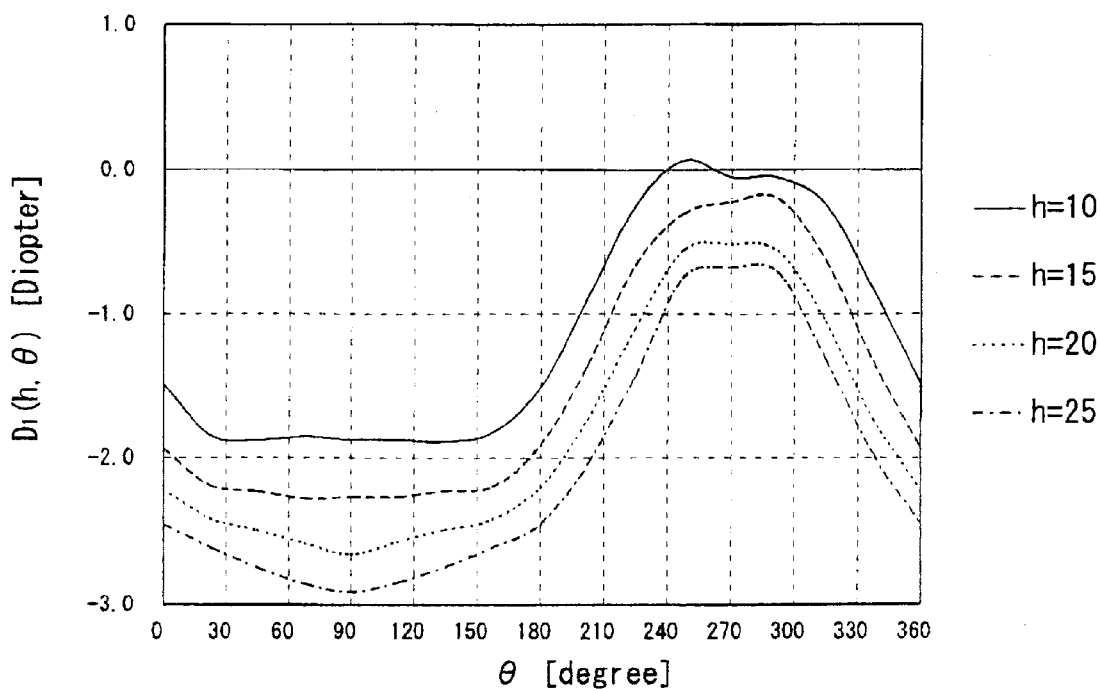
FIG. 41 is a table showing distribution of a surface power of the progressive-power surface of an actual lens of the fourth embodiment.
FIG. 42 is a graph showing variations of the surface powers of the progressive-power surface of the actual lens of the fourth embodiment.

The table in FIG. 41 indicates distribution of the surface power $D_1(h, \theta)$ of the progressive-power back surface according to the fourth embodiment at a point $(h, \theta)$. FIG. 42 is a graph showing a relationship between the surface powers $D_1(h, \theta)$ and the angle $\theta$ for each of the distances h=10 mm, 15 mm, 20 mm and 25 mm.

Figures 43, 44:
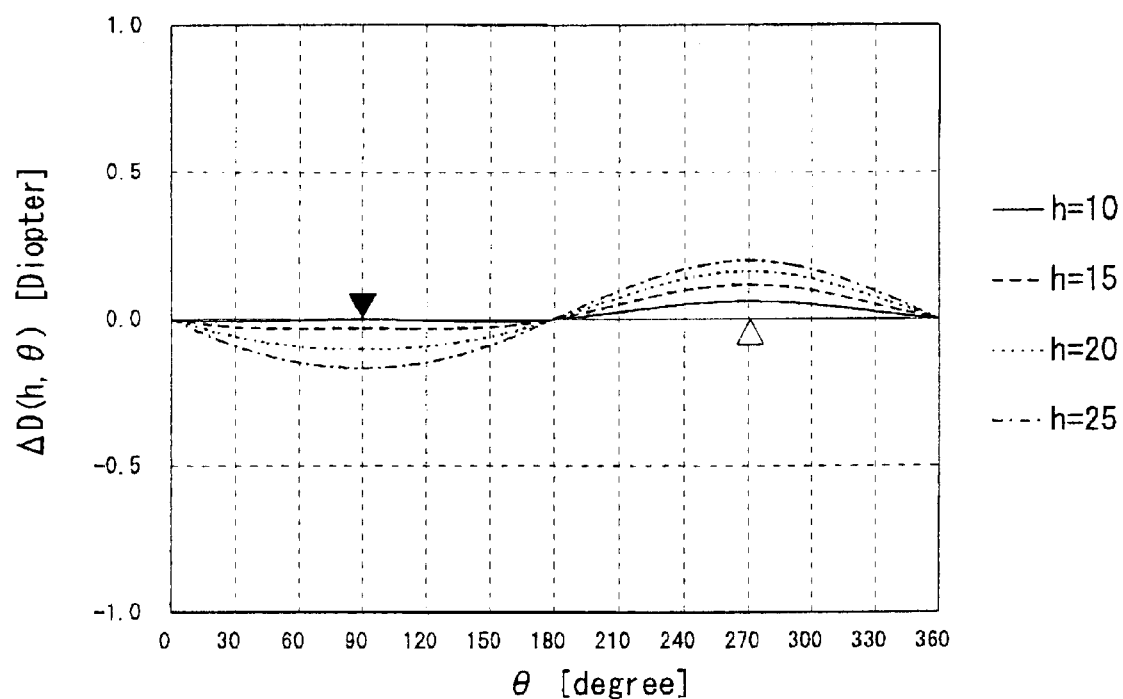
FIG. 43 is a table showing distribution of the difference between surface powers of the progressive-power surfaces of the actual lens and the reference lens according to the fourth embodiment.
FIG. 44 is a graph showing variations of the difference between the surface powers of the progressive-power surface of the actual lens and the reference lens according to the fourth embodiment.

FIGS. 43 and 44 illustrate how the reference lens is modified to form the progressive-power surface according to the fourth embodiment. The table in FIG. 43 indicates distribution of the difference $\Delta D(h, \theta)$ between the surface powers $D_1(h, \theta)$ of the actual progressive-power spectacle lens according to the fourth embodiment and the surface power $D_0(h, \theta)$ of the reference lens. FIG. 44 is a graph showing a relationship between the difference $\Delta D(h, \theta)$ of the surface powers and the angle $\theta$ for each of the distances h=10 mm, 15 mm, 20 mm and 25 mm.

The prismatic power $\Delta P$ of the differential prism is equal to 4.15$\Delta$ and the prism base setting $\Delta B$ thereof is equal to 90°. As shown in FIG. 44, the difference $\Delta D(h, \theta)$ of the surface powers is negative in the base region $45 \leq \theta \leq 135$ and is positive in the apex region $225 \leq \theta \leq 315$ for all of the distances h=10 mm, 15 mm, 20 mm and 25 mm. That is, the lens of the fourth embodiment satisfies the conditions (1) and (2).

Figure 45:
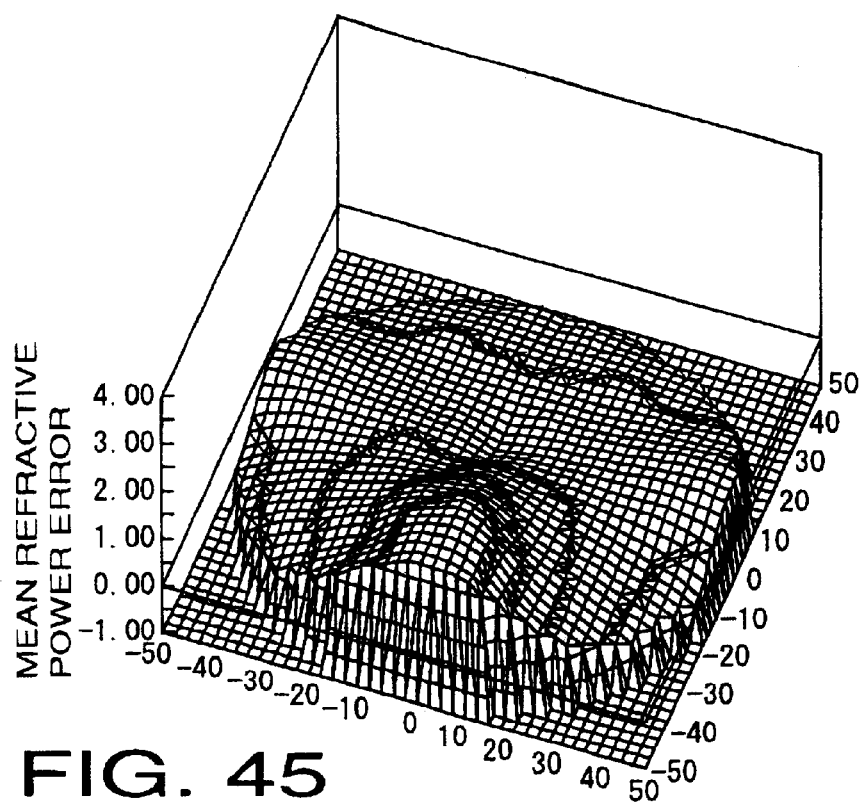
FIG. 45 is a three-dimension graph showing a mean refractive power error of the actual lens of the fourth embodiment.
Figure 46:
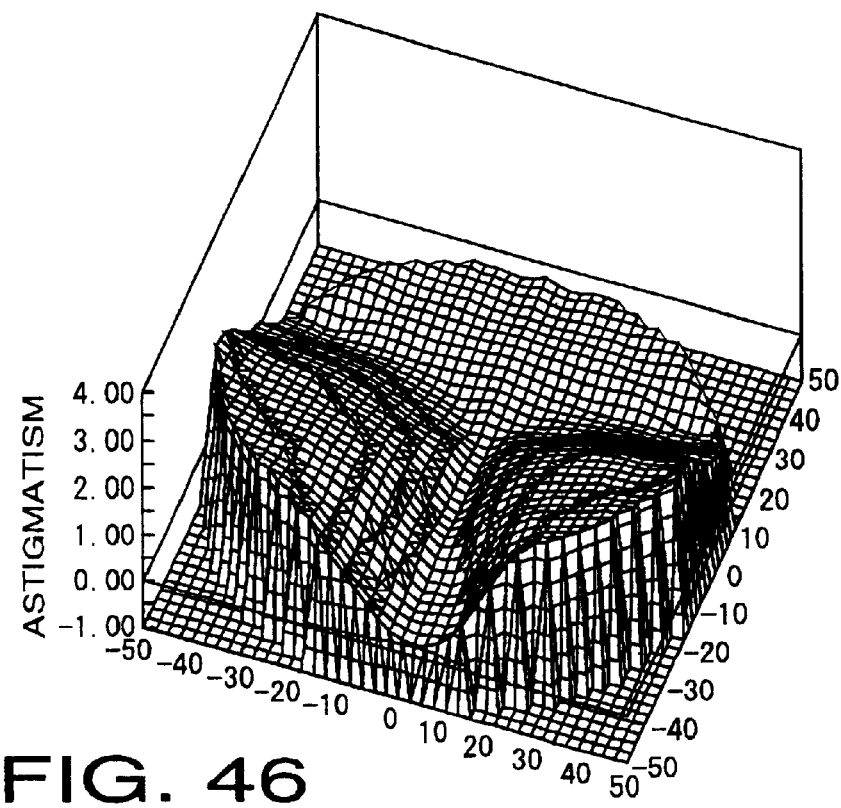
FIG. 46 is a three-dimension graph showing astigmatism of the actual lens of the fourth embodiment.

FIGS. 45 and 46 are three-dimensional graphs showing transmitting optical performances of the actual lens according to the fourth embodiment. FIG. 45 shows a mean refractive power error and FIG. 46 shows astigmatism. Comparing FIGS. 45 and 46 with FIGS. 37 to 40, it is understood that the optical performance of the fourth embodiment is improved with respect to the lens according to the fourth comparative example and is close to that of the reference lens.

Fifth Embodiment

In the fifth embodiment and the fifth comparative example corresponding to the fifth embodiment, the progressive-power spectacle lens has a spherical front surface and a progressive-power back surface and has a cylindrical power for correcting astigmatism. The reference lens corresponding to the fifth embodiment, whose specification is shown in TABLE 4, has no prescribed prismatic effect for correcting heterophoria, while it has an unprescribed prismatic effect caused by the prism thinning.

TABLE 4

| SPH | −4.00D | $D_1$ | 1.80 D |
|---|---|---|---|
| CYL | −2.00D | $D_{2F}$ | 6.80 D |
| AX | 45°0 | T | 1.10 mm |
| ADD | 2.00D | DIA | 75 mm |
| PRS | 0.71$\Delta$ | — | — |
| BASE | 270° | — | — |

Figures 47, 48:
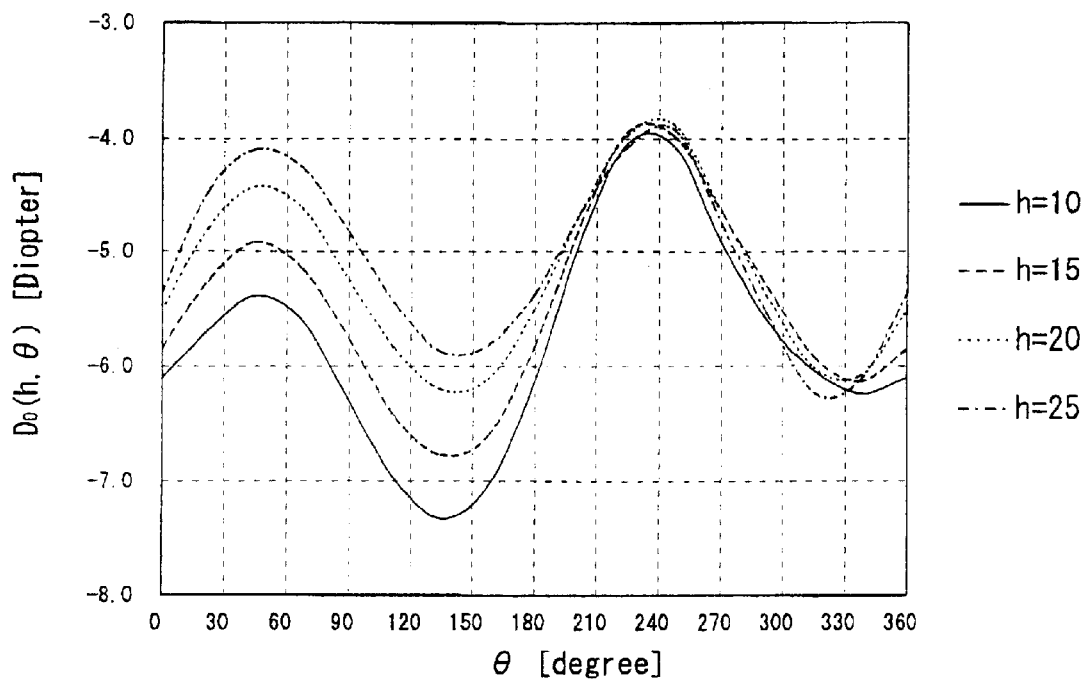
FIG. 47 is a table showing distribution of a surface power of the progressive-power surface of a reference lens for a fifth embodiment.
FIG. 48 is a graph showing variations of the surface powers of the progressive-power surface of the reference lens for the fifth embodiment.

The table in FIG. 47 indicates distribution of the surface power $D_0(h, \theta)$ of the progressive-power back surface of the reference lens corresponding to the fifth embodiment at a point (h, θ). FIG. 48 is a graph showing a relationship between the surface powers $D_0(h, θ)$ and the angle θ for each of the distances h=10 mm, 15 mm, 20 mm and 25 mm. Although the surface power shows a sine-wave like characteristic due to the cylindrical power, it is relatively low in the distance portion within 30≦θ≦150 and relatively high in the near portion within 240≦θ≦300 taking the entire lens as a whole.

Figure 49:
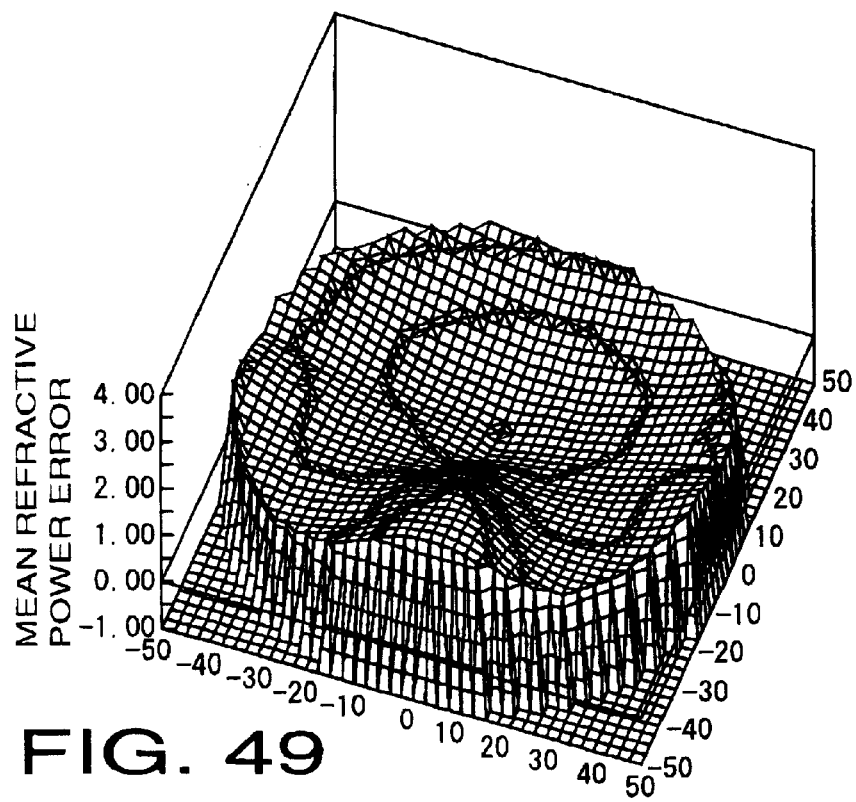
FIG. 49 is a three-dimension graph showing a mean refractive power error of the reference lens for the fifth embodiment.
Figure 50:
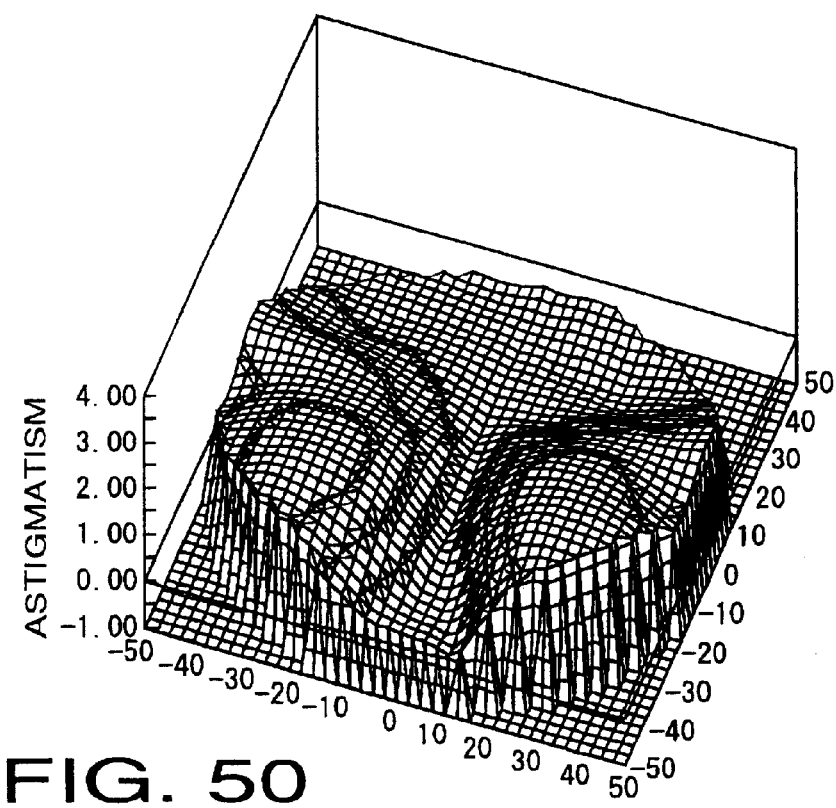
FIG. 50 is a three-dimension graph showing astigmatism of the reference lens for the fifth embodiment.

FIGS. 49 and 50 are three-dimensional graphs showing transmitting optical performances of the reference lens for the fifth embodiment. FIG. 49 shows a mean refractive power error and FIG. 50 shows astigmatism.

Next, the lens of the fifth comparative example will be described. The lens of the fifth comparative example is formed by tilting the front and back surfaces of the reference lens relatively with maintaining the shapes thereof so that a prescribed prismatic effect of PRS 3.00Δ and BASE 27° for correcting heterophoria is introduced.

Figure 51:
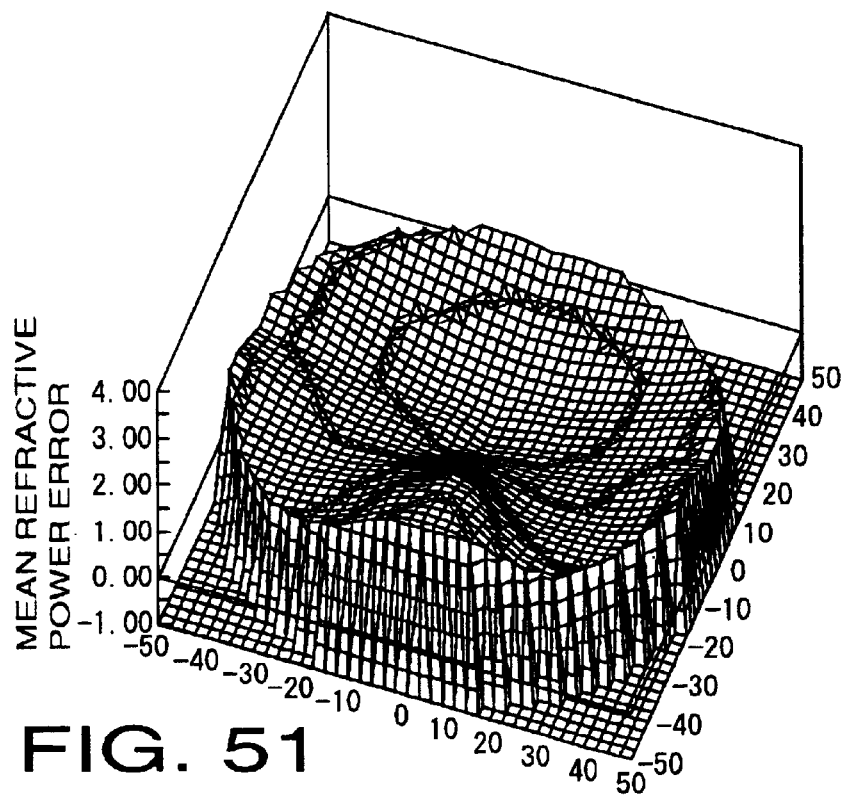
FIG. 51 is a three-dimension graph showing a mean refractive power error of a lens of a fifth comparative example.
Figure 52:
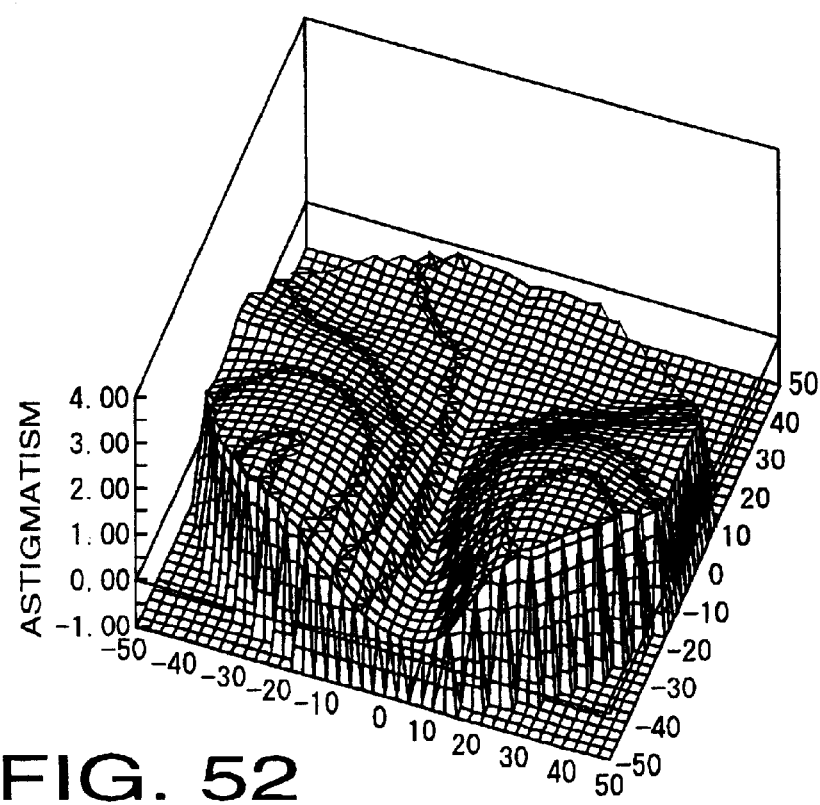
FIG. 52 is a three-dimension graph showing astigmatism of the lens of the fifth comparative example.

FIGS. 51 and 52 are three-dimensional graphs showing transmitting optical performances of the lens of the fifth comparative example; FIG. 51 shows a mean refractive power error and FIG. 52 shows astigmatism. Comparing FIGS. 51 and 52 with FIGS. 49 and 50, it is under stood that the optical performance of the fifth comparative example becomes lower than that of the reference lens.

The progressive-power spectacle lens according to the fifth embodiment is designed such that the prescribed prismatic effect of PRS 3.00Δ and BASE 27° for correcting heterophoria is introduced into the reference lens. The progressive-power spectacle lens according to the fifth embodiment is designed by changing the shape of the progressive-power surface of the reference lens and tilting the front and back surfaces relatively to introduce the prescribed prismatic effect.

Figures 53, 54:
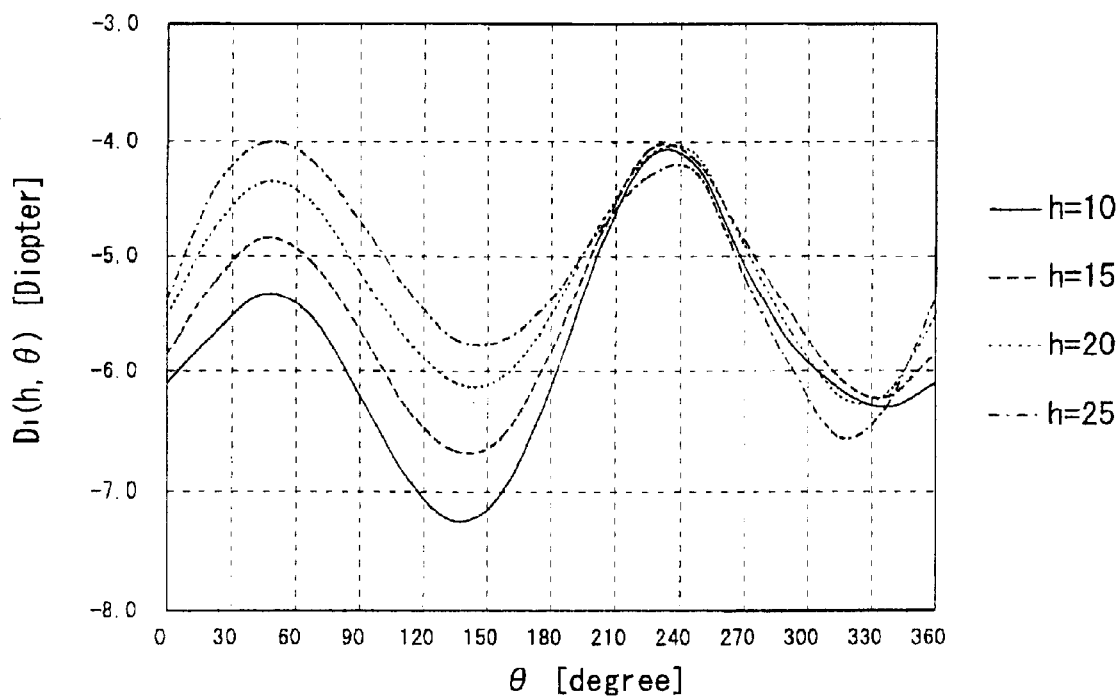
FIG. 53 is a table showing distribution of a surface power of the progressive-power surface of an actual lens of the fifth embodiment.
FIG. 54 is a graph showing variations of the surface powers of the progressive-power surface of the actual lens of the fifth embodiment.

The table in FIG. 53 indicates distribution of the surface power $D_1(h, θ)$ of the progressive-power back surface according to the fifth embodiment at a point (h, θ) along the intersection line. FIG. 54 is a graph showing a relationship between the surface powers $D_1(h, θ)$ and the angle θ for each of the distances h=10 mm, 15 mm, 20 mm and 25 mm.

Figures 55, 56:
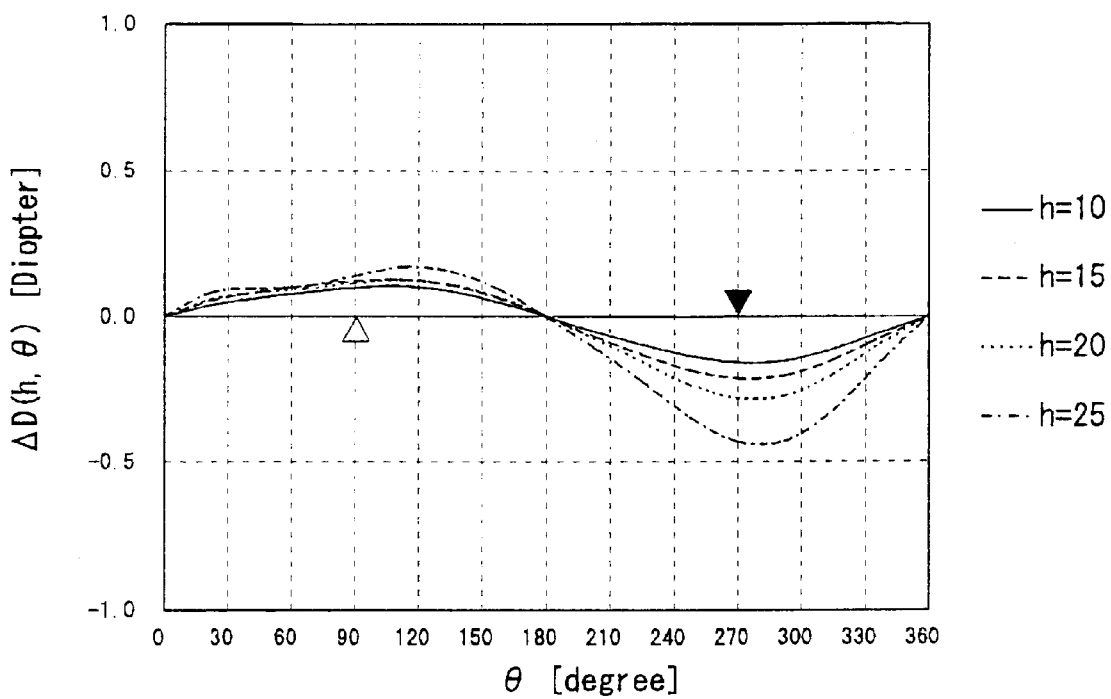
FIG. 55 is a table showing distribution of the difference between surface powers of the progressive-power surfaces of the actual lens and the reference lens according to the fifth embodiment.
FIG. 56 is a graph showing variations of the difference between the surface powers of the progressive-power surface of the actual lens and the reference lens according to the fifth embodiment.

FIGS. 55 and 56 illustrate how the reference lens is modified to form the progressive-power surface according to the fifth embodiment. The table in FIG. 55 indicates distribution of the difference $ΔD(h, θ)$ between the surface powers $D_1(h, θ)$ of the actual progressive-power spectacle lens according to the fifth embodiment and the surface power $D_0(h, θ)$ of the reference lens. FIG. 56 is a graph showing a relationship between the difference $ΔD(h, θ)$ of the surface powers and the angle θ for each of the distances h=10 mm, 15 mm, 20 mm and 25 mm.

The prismatic power ΔP of the differential prism is equal to 2.29Δ and the prism base setting ΔB thereof is equal to 270°. As shown in FIG. 56, the difference $ΔD(h, θ)$ of the surface powers is negative in the base region 225≦θ≦315 and is positive in the apex region 405≦θ≦495 (i.e., 45≦θ≦135) for all of the distances h=10 mm, 15 mm, 20 mm and 25 mm. That is, the lens of the fifth embodiment satisfies the conditions (1) and (2).

Figure 57:
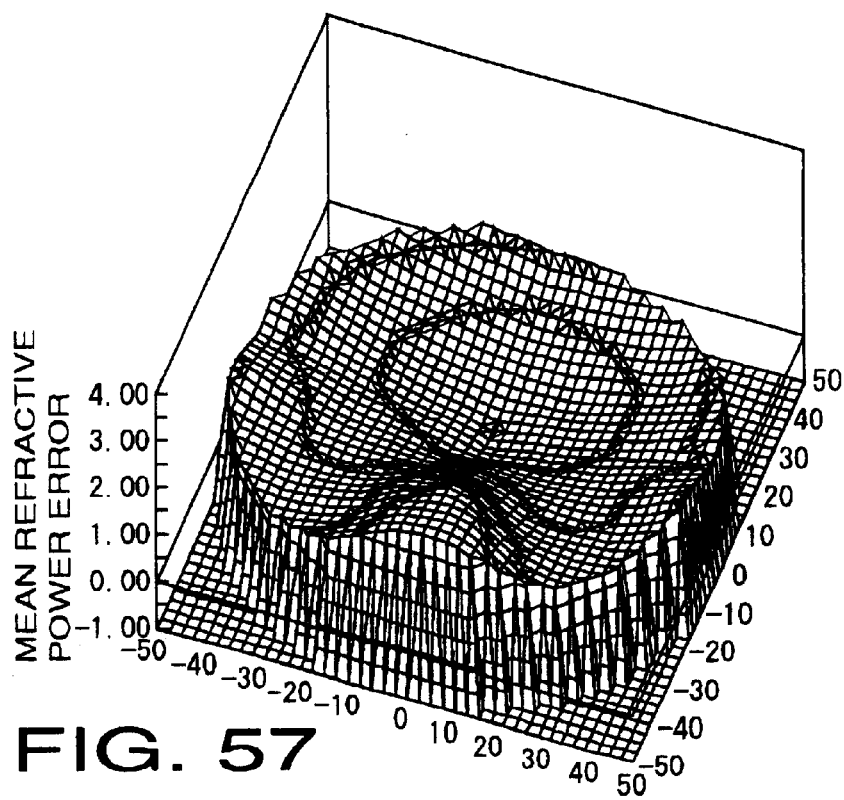
FIG. 57 is a three-dimension graph showing a mean refractive power error of the actual lens of the fifth embodiment.
Figure 58:
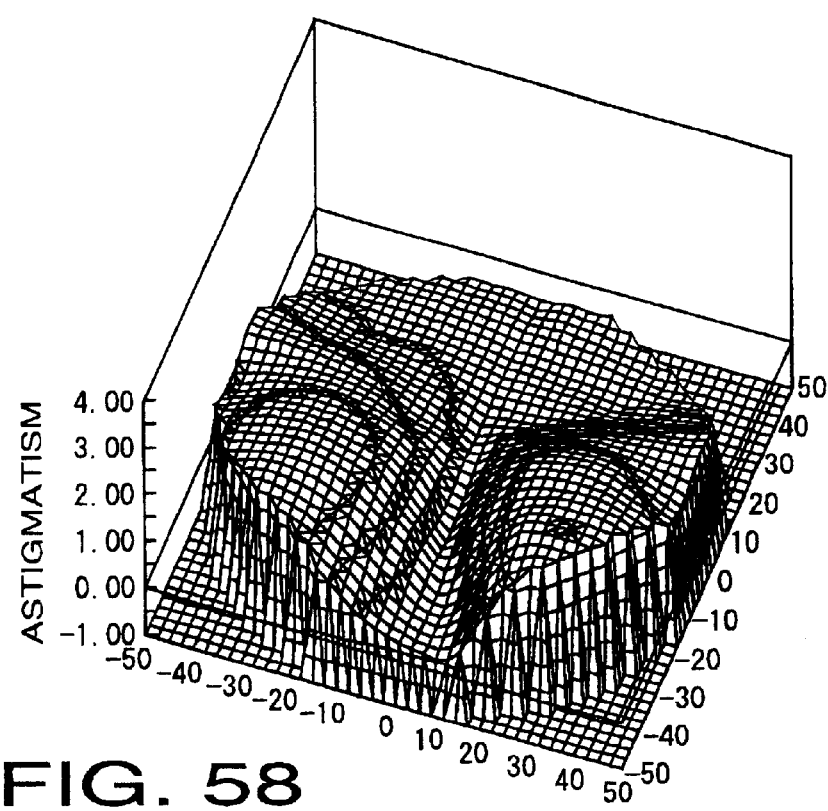
FIG. 58 is a three-dimension graph showing astigmatism of the actual lens of the fifth embodiment.
Figure 59:
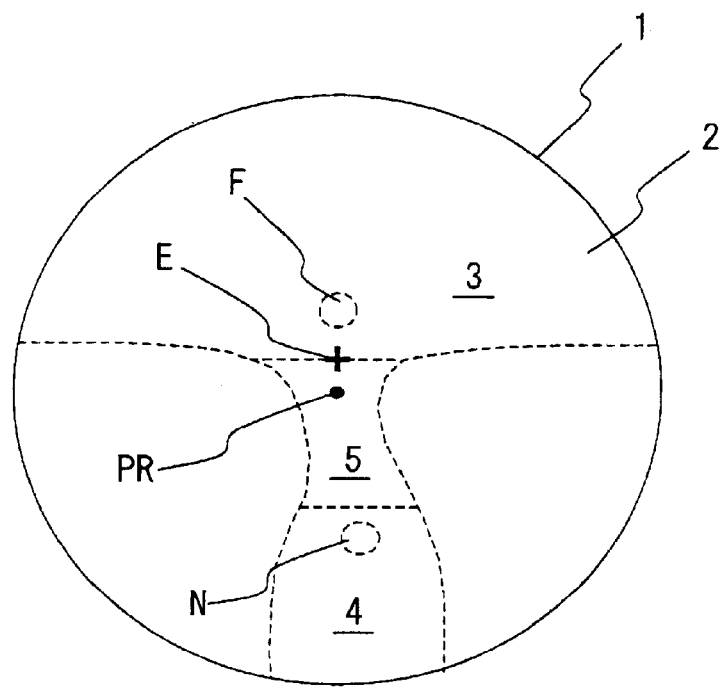
FIG. 59 is a front view showing one example of a conventional progressive-power surface of a progressive-power spectacle lens.
Figures 60A, 60B:
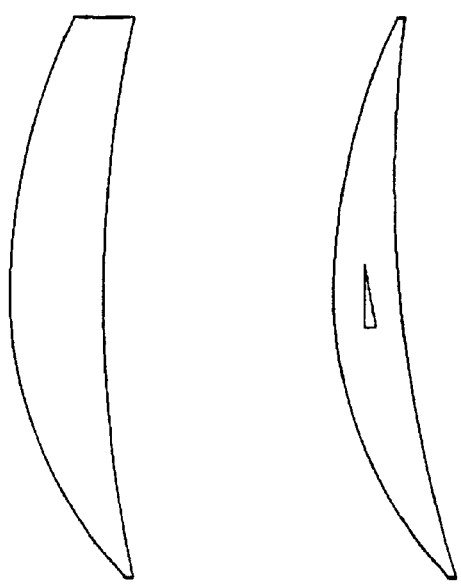
FIGS. 60A and 60B are sectional views of a progressive-power lens having a plus distance dioptric power.
Figures 61A, 61B:
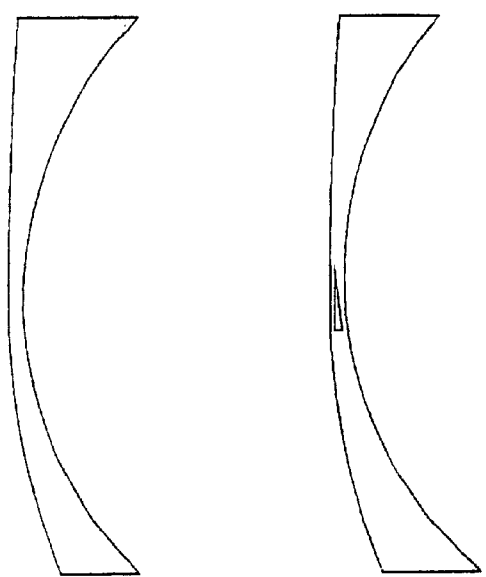
FIGS. 61A and 61B are sectional views of a conventional progressive-power lens having a minus distance dioptric power.

FIGS. 57 and 58 are three-dimensional graphs showing transmitting optical performances of the actual lens according to the fifth embodiment. FIG. 57 shows a mean refractive power error and FIG. 58 shows astigmatism. Comparing FIGS. 57 and 58 with FIGS. 49 to 52, it is understood that the optical performance of the fifth embodiment is improved with respect to the lens according to the fifth comparative example and is close to that of the reference lens.

As described above, the present invention provides a high-performance progressive-power spectacle lens having a prescribed prismatic effect for correcting heterophoria. By employing the progressive-power surface which is different from that of a reference lens having no prescribed prismatic effect, aberration caused by addition of the prescribed prismatic effect is well corrected.

The present disclosure relates to the subject matter contained in Japanese-Patent Application No. 2001-315280, filed on Oct. 12, 2001, which is expressly incorporated herein by reference in its entirety.

What is claimed is:

1. A progressive-power spectacle lens having a front surface and a back surface, said lens including a distance portion having a dioptric power for distance vision, a near portion having a dioptric power for near vision, and an intermediate portion having a progressive dioptric power for a vision in a range intermediate between the distance portion and the near portion, at least one of said front and back surfaces being formed as a progressive-power surface whose dioptric power varies depending upon a position thereon, said spectacle lens having a prismatic effect including a prescribed prismatic effect and unprescribed prismatic effect, a shape of said progressive-power surface of said spectacle lens being different from a shape of a progressive-power surface of a reference lens that is defined as a lens which does not have the prescribed prismatic effect and is identical in a spherical power, an astigmatic power, a cylinder axis and an addition power to said spectacle lens, said progressive surface of said spectacle lens being configured to compensate for aberration that is caused if the prescribed prismatic effect is added in the reference lens.

2. The spectacle lens according to claim 1, wherein said back surface is formed as said progressive-power surface.

3. The progressive-power spectacle lens according to claim 2, wherein said front surface is a spherical surface.

4. A progressive-power spectacle lens having a front surface and a back surface, said lens including a distance portion having a dioptric power for distance vision, a near portion having a dioptric power for near vision, and an intermediate portion having a progressive dioptric power for a vision in a range intermediate between the distance portion and the near portion, at least one of said front and back surfaces being formed as a progressive-power surface whose dioptric power varies depending upon a position thereon, said spectacle lens having a prismatic effect including a prescribed prismatic effect and unprescribed prismatic effect, wherein condition:

$$ΔD(h, θ)<0$$

is satisfied at a point within a region that is defined by 10≦h≦20 and ΔB−45≦θ≦ΔB+45, and wherein condition:

$$ΔD(h, θ)>0$$

is satisfied at a point within a region that is defined by 10≦h≦20 and ΔB+135≦θ≦ΔB+225, where, $$ΔB = \tan^{-1} \frac{P_1 \cdot \sin(B_1) - P_0 \cdot \sin(B_0)}{P_1 \cdot \cos(B_1) - P_0 \cdot \cos(B_0)},$$

$$θD(h, θ)=D_1(h, θ)-D_0(h, θ),$$

parameters with suffix "1" represent values for said spectacle lens, parameters with suffix "0" represent values for a reference lens that is defined as a lens which does not have the prescribed prismatic effect and is identical in a spherical power, an astigmatic power, a cylinder axis and an addition power to said spectacle lens, said progressive surface of said spectacle lens being configured to compensate for aberration that is caused if the prescribed prismatic effect is added in the reference lens P is a prismatic power (unit: prism diopter) at a prism reference point, the prism reference point being an origin of an x-y-z orthogonal left-hand coordinate system, z-axis being a normal to the progressive-power surface at a prism reference point that is the origin of the x-y-z coordinate system, y-axis being perpendicular to the z-axis and being a vertical axis when said spectacle lens is installed in a frame, x-axis being perpendicular to both the z-axis and y-axis in the left-hand coordinate system, the x-axis being a horizontal axis when the actual lens is installed in the frame;

B is a prism base setting (unit: degree), $D(h, \theta)$ is a surface power (unit: diopter) of said progressive-power surface of said spectacle lens, the surface power being defined by formula: $D(h, \theta) = (n'-n)C(h, \theta)$, $C(h, \theta)$ is a curvature (unit: diopter) at a point at a distance h from the z-axis on a line where said progressive-power surface intersects with a plane that includes the z-axis and forms an angle $\theta$ (unit: degrees) with x-axis, the z-axis being a normal, at the prism reference point, to said progressive-power surface of said spectacle lens, n is a refractive index of a medium on an object side with respect to said progressive-power surface of said spectacle lens, and n' is a refractive index of a medium on an eye side with respect to said progressive-power surface of said spectacle lens.

5. The progressive-power spectacle lens according to claim 4, wherein said back surface is said progressive-power surface.

6. The progressive-power spectacle lens according to claim 5, wherein said front surface is a spherical surface.

* * * * *